United States Patent
Jain et al.

(10) Patent No.: US 12,015,579 B2
(45) Date of Patent: Jun. 18, 2024

(54) TECHNIQUES FOR ENHANCING USER EQUIPMENT PERFORMANCE FOR MULTIPLE SUBSCRIBER IDENTIFICATION MODULE OPERATION

(71) Applicant: QUALCOMM Incorporated, San Diego, CA (US)

(72) Inventors: Sachin Jain, Santa Clara, CA (US); Rizwan Saudagar Mohammed, Milpitas, CA (US); Bhupesh Manoharlal Umatt, Poway, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 332 days.

(21) Appl. No.: 17/579,231

(22) Filed: Jan. 19, 2022

(65) Prior Publication Data
US 2022/0239450 A1 Jul. 28, 2022

Related U.S. Application Data

(60) Provisional application No. 63/141,435, filed on Jan. 25, 2021.

(51) Int. Cl.
*H04W 4/00* (2018.01)
*H04L 5/00* (2006.01)
(Continued)

(52) U.S. Cl.
CPC ............ *H04L 5/0098* (2013.01); *H04L 5/001* (2013.01); *H04L 5/0041* (2013.01);
(Continued)

(58) Field of Classification Search
CPC ..... H04L 5/0098; H04L 5/001; H04L 5/0041; H04L 5/0064; H04W 72/56; H04W 5/20; H04W 55/06
See application file for complete search history.

(56) References Cited

U.S. PATENT DOCUMENTS 10,440,599 B2 * 10/2019 Saxena ............ H04W 36/0066
2019/0335416 A1 10/2019 Kumar et al.
(Continued)

FOREIGN PATENT DOCUMENTS

WO WO-2010121199 A1 10/2010
WO WO-2021092741 A1 5/2021

OTHER PUBLICATIONS

International Search Report and Written Opinion—PCT/US2022/070269—ISA/EPO—dated May 9, 2022.
(Continued)

*Primary Examiner* — Abdelnabi O Musa
(74) *Attorney, Agent, or Firm* — Dalei Dong; Holland & Hart LLP

(57) ABSTRACT

Methods, systems, and devices for wireless communication at a user equipment (UE) are described. The UE may identify a first set of bands associated with a first subscription and a second set of bands associated with a second subscription. The UE may determine that at least a first band from the first set of bands and at least a second band from the second set of bands share a same set of radio frequency (RF) front-end resources. The UE may then refrain from communicating on a third band from the first set of bands while communicating on a remaining set of bands, where the third band may be associated with a secondary component carrier (SCC) of a multi-carrier communications scheme. Refraining from communicating on the third band may be based on the first and second bands sharing the RF front-end resources and the third band being associated with the SCC.

30 Claims, 13 Drawing Sheets

(51) Int. Cl.
   *H04W 8/20*       (2009.01)
   *H04W 72/0453*    (2023.01)
   *H04W 72/56*      (2023.01)
   *H04W 88/06*      (2009.01)

(52) U.S. Cl.
   CPC ............ *H04L 5/0064* (2013.01); *H04W 8/20* (2013.01); *H04W 72/0453* (2013.01); *H04W 72/56* (2023.01); *H04W 88/06* (2013.01)

(56) References Cited

U.S. PATENT DOCUMENTS

| | | | |
|---|---|---|---|
| 2020/0008143 A1* | 1/2020 | Jain | H04W 72/0453 |
| 2021/0029773 A1* | 1/2021 | Majumder | H04W 8/183 |
| 2021/0282103 A1* | 9/2021 | Zhu | H04W 76/15 |
| 2021/0360530 A1* | 11/2021 | Shahidi | H04W 76/27 |
| 2022/0039110 A1* | 2/2022 | Takeda | H04W 72/56 |
| 2022/0346075 A1* | 10/2022 | Wang | H04W 76/28 |
| 2023/0146103 A1* | 5/2023 | Cheng | H04L 5/0048 370/252 |
| 2023/0180309 A1* | 6/2023 | Zhang | H04W 76/10 370/328 |
| 2023/0319668 A1* | 10/2023 | Xie | H04W 36/30 370/331 |
| 2023/0319920 A1* | 10/2023 | Xie | H04W 76/15 370/328 |

OTHER PUBLICATIONS

Qualcomm Incorporated: "SSB Arrangements, BWP Operation and Other Issues for NTN", 3GPP TSG RAN WG1 #102-e, 3GPP Draft, R1-2006807, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020 (Aug. 8, 2020), 6 Pages, XP051918257, Retrieved from the Internet: URL: https://ftp.3gpp.org/tsg_ran/WG1_RL1/TSGR1_102-e/Docs/R1-2006807.zip, R1-2006807 SSB arrangements, BWP operation and other issues for NTN.docx [retrieved on Aug. 8, 2020], pp. 1-6, p. 2, paragraph "ALT 2".

* cited by examiner

TECHNIQUES FOR ENHANCING USER EQUIPMENT PERFORMANCE FOR MULTIPLE SUBSCRIBER IDENTIFICATION MODULE OPERATION

CROSS REFERENCE

The present Application for Patent claims the benefit of U.S. Provisional Patent Application No. 63/141,435 by JAIN et al., entitled "TECHNIQUES FOR ENHANCING USER EQUIPMENT PERFORMANCE FOR MULTIPLE SUBSCRIBER IDENTIFICATION MODULE OPERATION," filed Jan. 25, 2021, assigned to the assignee hereof, and expressly incorporated by reference herein.

FIELD OF DISCLOSURE

The field of disclosure, for example, relates to wireless communication at a user equipment (UE), including techniques for enhancing UE performance for multiple subscriber identification module operations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may support multiple subscriptions to connect with multiple networks simultaneously. Additionally, a UE may support a non-standalone architecture to connect with multiple networks. In some cases, communications in a non-standalone architecture may be unstable and may adversely impact the performance of the UE.

SUMMARY

The described techniques relate to improved methods, systems, devices, and apparatuses that support techniques for enhancing user equipment performance for multiple subscriber identification module operation. In some examples, the described techniques provide for a user equipment (UE) to use enhanced techniques for communication. A UE may be configured with multiple subscriber identification modules. Each subscriber identification module may be associated with a subscription that allows the UE to connect to and communicate with a network. In some cases, each subscriber identification module may connect to a different network, be associated with a different radio access technology, or any combination thereof. In some examples, the UE may connect to a first cell in a non-standalone mode of operation. In addition, a first band on the first subscription and a second band on the second subscription may have the same downlink path resulting in a full tune-away at the UE, for example, where the UE may tune away from the first subscription to another subscription (e.g., for idle mode operations), where the first subscription may lose access to radio frequency resources for the duration of the tune away.

According to some aspects, the UE may identify a first set of bands associated with a first subscription and a second set of bands associated with a second subscription. In some examples, the second subscription may be different from the first subscription. The UE may determine that at least one band from the first set of bands and at least one band from the second set of bands share a set of radio frequency (RF) front-end resources. For example, the UE may determine that some combination of bands associated with each subscription may cause the UE to perform a full tune-away operation from one subscription when communicating using the combination of bands. The UE may then refrain from communicating on one band from the first set of bands. As an example, the UE may refrain from communicating on a band from the first set of bands based on determining that a first band from the first set of bands and a second band from the second set of bands share the set of RF front-end resources, where the band may be associated with a secondary component carrier. By refraining from communicating on the band associated with the secondary component carrier, the first band and the second band may be fully concurrent, thereby avoiding tune away.

A method for wireless communication at a UE is described. The method may include identifying a first set of bands associated with a first subscription, identifying a second set of bands associated with a second subscription different from the first subscription, determining that a first band from the first set of bands and a second band from the second set of bands share a set of radio frequency front-end resources, refraining from communicating on a third band from the first set of bands, the third band being associated with a secondary component carrier of a multi-carrier communications scheme, where refraining from communicating on the third band is based on determining that the first band and the second band share the set of radio frequency front-end resources and the third band being associated with the secondary component carrier, and communicating on a remaining set of bands from the first set of bands and the second set of bands based on refraining from communicating on the third band.

An apparatus for wireless communication at a UE is described. The apparatus may include a processor, memory coupled with the processor, and instructions stored in the memory. The instructions may be executable by the processor to cause the apparatus to identify a first set of bands associated with a first subscription, identify a second set of bands associated with a second subscription different from the first subscription, determine that a first band from the first set of bands and a second band from the second set of bands share a set of radio frequency front-end resources, refrain from communicating on a third band from the first set of bands, the third band being associated with a secondary component carrier of a multi-carrier communications scheme, where refraining from communicating on the third band is based on determining that the first band and the second band share the set of radio frequency front-end resources and the third band being associated with the secondary component carrier, and communicate on a remaining set of bands from the first set of bands and the second set of bands based on refraining from communicating on the third band.

Another apparatus for wireless communication at a UE is described. The apparatus may include means for identifying a first set of bands associated with a first subscription, means for identifying a second set of bands associated with a second subscription different from the first subscription, means for determining that a first band from the first set of bands and a second band from the second set of bands share a set of radio frequency front-end resources, means for refraining from communicating on a third band from the first set of bands, the third band being associated with a secondary component carrier of a multi-carrier communications scheme, where refraining from communicating on the third band is based on determining that the first band and the second band share the set of radio frequency front-end resources and the third band being associated with the secondary component carrier, and means for communicating on a remaining set of bands from the first set of bands and the second set of bands based on refraining from communicating on the third band.

A non-transitory computer-readable medium storing code for wireless communication at a UE is described. The code may include instructions executable by a processor to identify a first set of bands associated with a first subscription, identify a second set of bands associated with a second subscription different from the first subscription, determine that a first band from the first set of bands and a second band from the second set of bands share a set of radio frequency front-end resources, refrain from communicating on a third band from the first set of bands, the third band being associated with a secondary component carrier of a multi-carrier communications scheme, where refraining from communicating on the third band is based on determining that the first band and the second band share the set of radio frequency front-end resources and the third band being associated with the secondary component carrier, and communicate on a remaining set of bands from the first set of bands and the second set of bands based on refraining from communicating on the third band.

Some examples of the method, apparatuses, and non-transitory computer-readable medium described herein may further include operations, features, means, or instructions for determining that the third band may be configured as the secondary component carrier and determining an absence of control signaling activating the third band associated with the secondary component carrier, where refraining from communicating on the third band includes dropping the third band based on the absence of the control signaling activating the third band associated with the secondary component carrier.

Some examples of the method, apparatuses, and non-transitory computer-readable medium described herein may further include operations, features, means, or instructions for receiving, from a base station, control signaling activating the third band associated with the secondary component carrier and determining that the third band associated with the secondary component carrier and may be activated based on receiving the control signaling.

In some examples of the method, apparatuses, and non-transitory computer-readable medium described herein, refraining from communicating on the third band may include operations, features, means, or instructions for dropping the third band associated with the secondary component carrier based on determining that the first band from the first set of bands and the second band from the second set of bands shares the set of radio frequency front-end resources and the third band being activated.

In some examples of the method, apparatuses, and non-transitory computer-readable medium described herein, refraining from communicating on the third band may include operations, features, means, or instructions for reporting a compensated measurement on the third band associated with the secondary component carrier based on determining that the first band from the first set of bands and the second band from the second set of bands share the set of radio frequency front-end resources and the third band being activated, where the third band may be dropped based on the reported compensated measurement.

Some examples of the method, apparatuses, and non-transitory computer-readable medium described herein may further include operations, features, means, or instructions for identifying a number of resource grants associated with the secondary component carrier based on the third band being activated, where the third band may be dropped based on the identified number of resource grants associated with the secondary component carrier.

Some examples of the method, apparatuses, and non-transitory computer-readable medium described herein may further include operations, features, means, or instructions for deprioritizing the third band from the first set of bands based on determining that the first band from the first set of bands and the second band from the second set of bands shares the set of radio frequency front-end resources.

In some examples of the method, apparatuses, and non-transitory computer-readable medium described herein, deprioritizing the third band may include operations, features, means, or instructions for reporting a compensated measurement on the third band from the first set of bands based on determining that the first band from the first set of bands and the second band from the second set of bands share the set of radio frequency front-end resources.

In some examples of the method, apparatuses, and non-transitory computer-readable medium described herein, deprioritizing the third band may include operations, features, means, or instructions for refraining from reporting a measurement on the third band from the first set of bands based on determining that the first band from the first set of bands and the second band from the second set of bands share the set of radio frequency front-end resources.

In some examples of the method, apparatuses, and non-transitory computer-readable medium described herein, communicating on the remaining set of bands from the first set of bands may include operations, features, means, or instructions for simultaneously communicating on the remaining set of bands for the first subscription and the second set of bands for the second subscription based on refraining from communicating on the third band associated with the secondary component carrier.

In some examples of the method, apparatuses, and non-transitory computer-readable medium described herein, determining that the first band from the first set of bands and the second band from the second set of bands share the set of radio frequency front-end resources may include operations, features, means, or instructions for determining that a combination of at least the first band, the second band, and the third band may be associated with a full tune-away operation from the first subscription. In some examples of the method, apparatuses, and non-transitory computer-readable medium described herein, the UE may be configured to operate in a non-standalone mode of operation using the first set of bands.

In some examples of the method, apparatuses, and non-transitory computer-readable medium described herein, the first subscription may be associated with a multi-carrier operation and the second subscription may be associated with a single-carrier operation. In some examples of the method, apparatuses, and non-transitory computer-readable medium described herein, a communication state for the first set of bands includes a dual-connectivity mode and a communication state for the second set of bands includes an idle mode.

A method for wireless communication at a UE is described. The method may include identifying a first set of bands associated with a first subscription, identifying a second set of bands associated with a second subscription different from the first subscription, determining that a first band from the first set of bands and a second band from the second set of bands share a set of radio frequency front-end resources, and transmitting, to a base station, a capability report excluding the first band and a third band from the first set of bands based on determining that the first band and the second band shares the set of radio frequency front-end resources, the third band being associated with a secondary component carrier of a multi-carrier communications scheme.

An apparatus for wireless communication at a UE is described. The apparatus may include a processor, memory coupled with the processor, and instructions stored in the memory. The instructions may be executable by the processor to cause the apparatus to identify a first set of bands associated with a first subscription, identify a second set of bands associated with a second subscription different from the first subscription, determine that a first band from the first set of bands and a second band from the second set of bands share a set of radio frequency front-end resources, and transmit, to a base station, a capability report excluding the first band and a third band from the first set of bands based on determining that the first band and the second band shares the set of radio frequency front-end resources, the third band being associated with a secondary component carrier of a multi-carrier communications scheme.

Another apparatus for wireless communication at a UE is described. The apparatus may include means for identifying a first set of bands associated with a first subscription, means for identifying a second set of bands associated with a second subscription different from the first subscription, means for determining that a first band from the first set of bands and a second band from the second set of bands share a set of radio frequency front-end resources, and means for transmitting, to a base station, a capability report excluding the first band and a third band from the first set of bands based on determining that the first band and the second band shares the set of radio frequency front-end resources, the third band being associated with a secondary component carrier of a multi-carrier communications scheme.

A non-transitory computer-readable medium storing code for wireless communication at a UE is described. The code may include instructions executable by a processor to identify a first set of bands associated with a first subscription, identify a second set of bands associated with a second subscription different from the first subscription, determine that a first band from the first set of bands and a second band from the second set of bands share a set of radio frequency front-end resources, and transmit, to a base station, a capability report excluding the first band and a third band from the first set of bands based on determining that the first band and the second band shares the set of radio frequency front-end resources, the third band being associated with a secondary component carrier of a multi-carrier communications scheme.

Some examples of the method, apparatuses, and non-transitory computer-readable medium described herein may further include operations, features, means, or instructions for identifying a set of multiple combinations of bands from the first set of bands and the second set of bands for communicating with the base station, where a combination of the first band and the second band may be included in the set of multiple combinations. In some examples of the method, apparatuses, and non-transitory computer-readable medium described herein, transmitting the capability report may include operations, features, means, or instructions for transmitting the capability report including a remaining number of combinations of the set of multiple combinations of bands from the first set of bands and the second set of bands.

Some examples of the method, apparatuses, and non-transitory computer-readable medium described herein may further include operations, features, means, or instructions for refraining from communicating on the third band based on transmitting the capability report excluding the first band and the third band. In some examples of the method, apparatuses, and non-transitory computer-readable medium described herein, the UE may be configured to operate in a non-standalone mode of operation.

In some examples of the method, apparatuses, and non-transitory computer-readable medium described herein, the first subscription may be associated with a multi-carrier operation and the second subscription may be associated with a single-carrier operation. In some examples of the method, apparatuses, and non-transitory computer-readable medium described herein, a communication state for the first set of bands includes a dual-connectivity mode a communication state for the second set of bands includes an idle mode.

DETAILED DESCRIPTION

Figure 1:
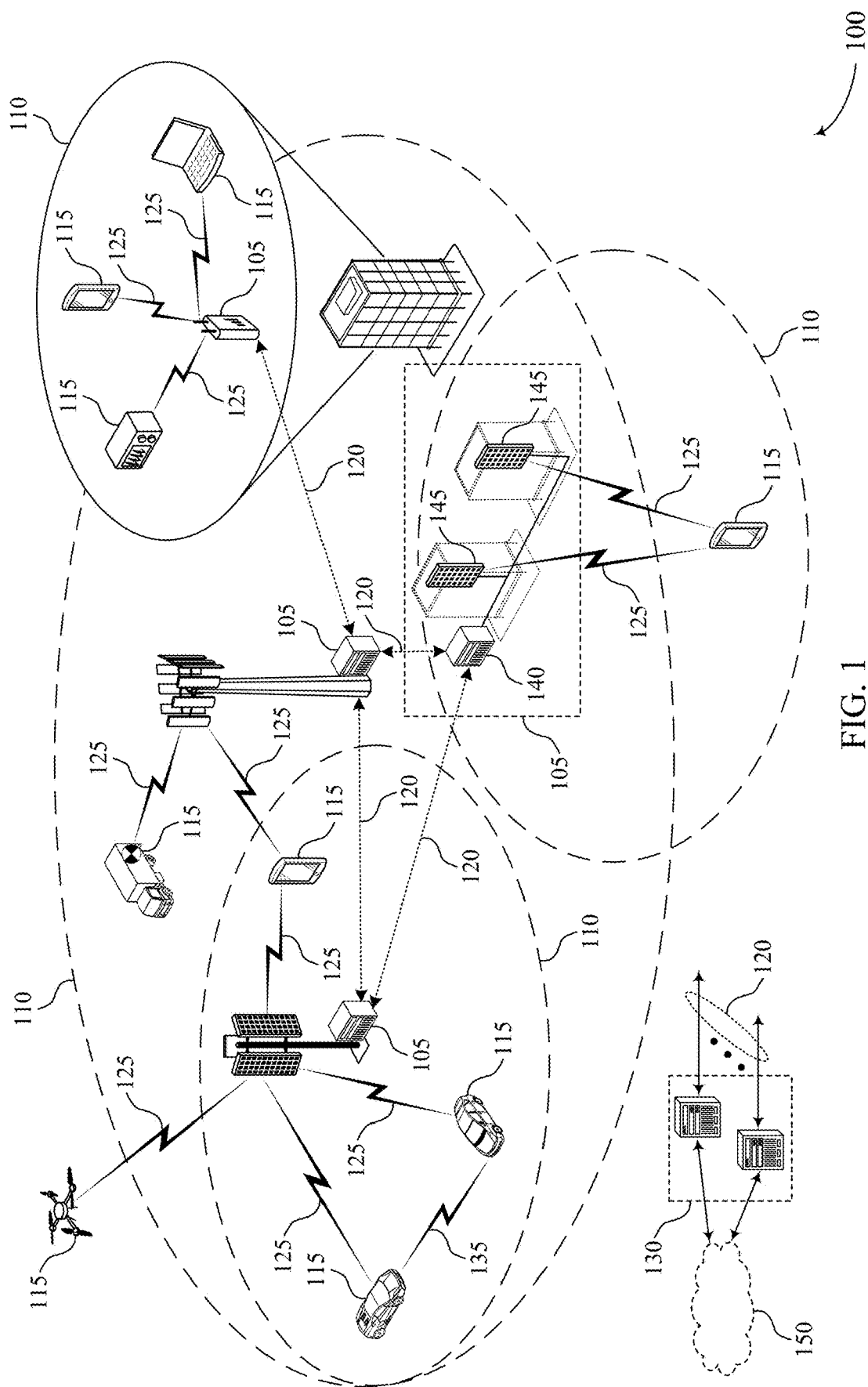
FIG. 1 illustrates an example of a wireless communications system that supports techniques for enhancing user equipment performance for multiple subscriber identification module operation in accordance with aspects of the present disclosure.

A user equipment (UE) may support communications with a network using a dual (e.g., non-standalone) architecture, where different radio access technologies may be used concurrently or simultaneously. For example, a non-standalone UE may anchor on or connect to a cell associated with a first radio access technology (e.g., Long-Term Evolution (LTE)), while facilitating communications with a cell associated with a second radio access technology (e.g., New Radio (NR)). In some cases, the cells associated with each radio access technology may be related to (e.g., provided by, associated with) a single base station or may be related to separate base stations.

As described herein, some wireless networks may be configured to operate in a dual-connectivity configuration. For example, a wireless network may be configured to operate in an evolved universal terrestrial radio access network (E-UTRAN) in NR, which may be referred to as EN-DC, as 5G EN-DC, or as a 5G NR dual-connectivity configuration or system, or some combination thereof. Broadly, the dual-connectivity configuration may support the UE being connected to two cells or two devices, such as base stations, (or nodes) at the same time. In some examples, one node (e.g., a master node) may be a 5G (e.g., an NR) node and a second node (e.g., a secondary node) may be an LTE node. In other examples, the master node may be an LTE node and the secondary node may be a 5G (e.g., NR) node. In some examples, the master node and the secondary node may be 5G (e.g., NR) nodes or they may both be LTE nodes. The dual-connectivity configuration may be supported when inter-connectivity has been established between the master node and secondary node, via one or more backhaul links, core network functions, or the like. Some examples of dual-connectivity may include the UE being concurrently or simultaneously connected to the LTE and 5G NR node or the UE utilizing the LTE node for control plane information and the 5G NR node for user plane traffic, or any combination thereof. In some aspects, the dual-connectivity configuration may support direct or split signaling radio bearers (or both).

In some wireless communications systems, a UE may be configured with multiple subscriber identification modules. That is, the UE may support a first subscriber identification module (SIM) corresponding to a first subscription, and the UE may further support a second SIM corresponding to a second, different subscription. Such techniques may be referred to as multiple subscriber identification module (MSIM), milti-SIM, or other like terminology. Each subscriber identification module may be associated with a subscription that allows the UE to connect to and communicate with a network. In some cases, each subscriber identification module may connect to a different network.

For example, the UE may have a first subscriber identification module with a first subscription providing access to a first network (e.g., 5G network), and a second subscriber identification module with a second subscription providing access to a second network (e.g., 4G network). Alternatively, the first subscriber identification module with the first subscription and the second subscriber identification module with the second subscription may provide access to the same network. In some examples, the first subscriber identification module with the first subscription and the second subscriber identification module with the second subscription may be configured to support NR technology and may be configured to concurrently or simultaneously operate in a non-standalone mode of operation.

According to one or more aspects of the present disclosure, the UE may establish a connection with a cell of a radio access technology using a first subscription and a second subscription. While operating in a non-standalone mode of operation, the UE may be configured with a first set of bands for a first subscription and a second set of bands for a second subscription. In some instances, a UE hardware may be designed such that a first band on the first subscription and a second band on the second subscription has the same downlink path. That is, a first band on the first subscription and a second band on the second subscription may be configured to share a common set of radio frequency (RF) front-end resources. For example, the UE may be configured with set of RF spectrum bands (e.g., a B66 band, a B2 band, and an n71 band) on the first subscription and another set of RF spectrum bands (e.g., a wideband code division multiple access (WCDMA) B2 band) on the second subscription. In this example, the n71 band and the WCDMA B2 band may be configured to use the common set of resources (e.g., RF front-end resources of the UE) resulting in a full tune-away of the n71 band, for example, during a paging operation on the WCDMA B2 band (e.g., while in idle mode). Because the n71 band may provide high throughput (e.g., in accordance with NR technology) and may be used for communications with a network, this full tune-away hampers the overall throughput supported by the UE and, in turn, hampers the UE performance and degrades the user experience.

To decrease latency and improve resource efficiency, a UE may determine that a combination of bands are not fully concurrent and that the UE may be configured to perform a full tune-away operation when communicating using the combination of bands. In such cases, the UE may then refrain from communicating on (e.g., dropping, deprioritizing) some bands to enable communications on the determined combination of bands without full tune away. In some examples, if a band associated with a secondary component carrier is configured at the first subscription, the UE can drop the band associated with the secondary component carrier. In another example, the UE may deprioritize some combination of bands which causes the UE to switch to a full tune-away mode when such bands are activated. In some aspects, the UE determines that a combination of bands causes the UE to switch to a full tune away mode. In such an example, the UE may refrain from including an indication of such a combination of bands in a capability report to a base station.

UEs capable of supporting full-concurrency between multiple subscriptions may utilize the techniques described herein to experience power saving, such as reduced power consumption and extended battery life while ensuring reliable and efficient communications between UEs and base stations, among other benefits. Aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. Additionally or alternatively, the techniques employed by the described UEs may provide time and power savings for multiple subscriptions. In some examples, the UEs may support high reliability and low latency communications, among other examples, in accordance with aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further described in the context of a hardware configuration and a process flow. Aspects of the disclosure are further illustrated by and described with reference to apparatus diagrams, system diagrams, and flowcharts that relate to techniques for enhancing user equipment performance for multiple subscriber identification module operation.

FIG. 1 illustrates an example of a wireless communications system 100 that supports techniques for enhancing user equipment performance for multiple subscriber identification module operation in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with some bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to other UEs 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some examples, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at some orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with some orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a high signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a high signal strength, high signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may operate in accordance with various states or modes for communicating with a network. As an example, a UE may operate in an RRC idle state (e.g., RRC_IDLE), an RRC inactive state (e.g., RRC_INACTIVE), and/or an RRC connected state (e.g., RRC_CONNECTED). The UE 115 may transition between the various states or modes, for example, based on communications traffic for the UE 115. In the RRC idle state (which may be referred to as an idle mode), a UE 115 may not be registered to a cell, and may accordingly lack an access stratum (AS)

context, and the UE 115 may thus not have an active RRC connection established with the network (e.g., via a base station 105). In the idle mode, the UE 115 may wake up periodically to monitor channels for paging or other signaling, and the mobility of the UE 115 may be managed by the UE 115 when performing measurements of one or more cells. In the RRC connected state (which may be referred to as a connected mode), the UE 115 may have an established RRC connection (e.g., with a 5GC) where the UE 115 may store an AS context. Here, the UE 115 may belong to a known cell and may be identified using a cell radio network temporary identifier (C-RNTI) assigned to the UE 115. While in the connected mode, the UE 115 may monitor for messages transmitted by the network, which may include monitoring various channels (e.g., paging channels, control channels, or the like).

The RRC inactive state may be used to reduce signaling overhead and may provide an intermediate mode (e.g., between idle and connected), which may also be used to reduced latency when transitioning to another mode (e.g., to the connected mode). The UE 115 may periodically wake up while in the inactive mode to monitor for paging messages from the network, where the UE 115 may in some cases, perform a random access procedure to move to the connected mode and communicate with the network.

In wireless communications system 100, a UE 115 may connect to an LTE cell in a non-standalone mode of operation. The UE 115 may support dual connectivity with NR and LTE. Additionally, a 5G dual-subscriber identity module UE 115 (e.g., phone) may support two subscriptions. While operating in the non-standalone mode of operation, the UE 115 may be configured with a first set of bands for a first subscription and a second set of bands for a second subscription. In some examples, UE hardware may be designed such that a first band on the first subscription and a second band on the second subscription has the same downlink path. For example, the first band and the second band may have the same downlink path (e.g., share common resources) resulting in a full tune away of the first band during a paging operation on the second band.

One or more aspects of the present disclosure provides for a UE 115 determining that a combination of bands are not fully concurrent and may cause the UE 115 to perform a full tune-away when communicating using the combination of bands. In some examples, the UE 115 may identify a first set of bands associated with a first subscription and a second set of bands associated with a second subscription. In some examples, the second subscription may be different from the first subscription. The UE 115 may determine that a first band from the first set of bands and a second band from the second set of bands share a set of radio frequency front-end resources (e.g., a same downlink path from an RF front-end component of the UE). That is, the UE 115 may determine that the first band and the second band are associated with a common downlink path. The UE 115 may then refrain from communicating on a third band from the first set of bands (and associated with the first subscription) that is associated with a secondary component carrier while communicating on a remaining set of bands from the first set of bands and the second set of bands (e.g., excluding the third band). In some examples, the third band may be different from the first band and the second band. The UE 115 may refrain from communicating based on determining that the first band from and the second band share the set of radio frequency front-end resources and the third band being associated with the secondary component carrier. It is noted that a band may also be described as an RF spectrum band, and these terms may be interchangeable. As such, reference to a first band or second band herein may also be described as a first RF spectrum band or a second RF spectrum band, respectively.

Figure 2:
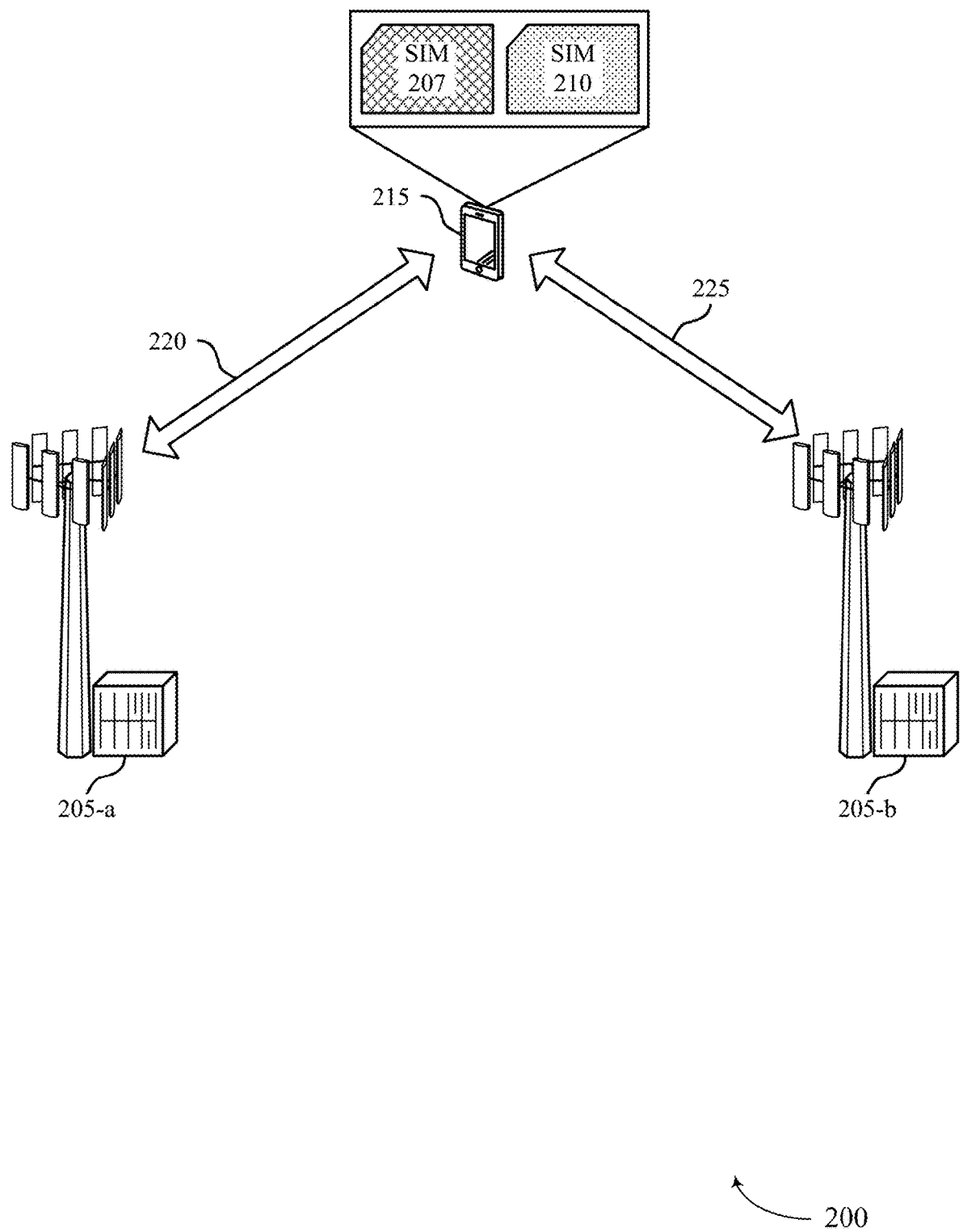
FIG. 2 illustrates an example of a wireless communications system that supports techniques for enhancing user equipment performance for multiple subscriber identification module operation in accordance with aspects of the present disclosure.

FIG. 2 illustrates an example of a wireless communications system 200 that supports techniques for enhancing user equipment performance for multiple subscriber identification module operation in accordance with aspects of the present disclosure. In some examples, the wireless communications system 200 may implement aspects of the wireless communications system 100. The wireless communications system 200 may include base station 205-*a*, base station 205-*b*, and UE 215, which may be examples of base stations 105 and a UE 115 as described with reference to FIG. 1. Each base station 105 may serve a geographic coverage area. In some cases, one or more of the geographic coverage areas served by base stations 205-*a* and 205-*b* may overlap. In some cases, the UE 215 may be configured with multiple subscriber identification module functionality and may be configured to support improved multiple subscription communications by communicating of a subset of configured bands. For example, a UE hardware may be designed such that a first band on the first subscription and a second band on the second subscription share a same downlink path. In such cases, the UE 215 may refrain from communicating on a combination of bands causing full tune-away to improve communications.

In the example of FIG. 2, the UE 215 may operate in a non-standalone mode. That is, the UE 215 may support a non-standalone architecture, where different radio access technologies may be utilized concurrently or simultaneously by different serving base stations. For example, a non-standalone UE may anchor on or connect to a first cell while facilitating communications with a second cell. Additionally or alternatively, a non-standalone UE may anchor on or connect to a cell associated with a first radio access technology (e.g., LTE), while facilitating communications with a cell associated with a second radio access technology (e.g., NR). In some cases, the cells associated with each radio access technology may be contained at a single base station or may be located on separate base stations.

In some examples, the UE 215 may support multiple subscriptions. In some cases, the UE 215 may be an example of a dual-subscriber identification module, or multi-subscriber identification module. For example, the UE 215 may include a first subscriber identification module 207 (SIM 207) and a second subscriber identification module 210 (SIM 210). The first subscriber identification module 207 may provide a first subscription (which may be referred to as a default data SIM (DDS), and the second subscriber identification module 210 may provide a second subscription (which may be referred to as a non-DDS). In some cases, one or both subscriptions (e.g., the first subscriber identification module 207 and the second subscriber identification module 210) may be configured to support a non-standalone architecture. In some instances, the first subscriber identification module 207 and the second subscriber identification module 210 may be camped on a first cell. That is, the UE 215 may communicate with a first cell via the first subscription and may concurrently or simultaneously communicate with the first cell via the second subscription. In some cases, the first cell may be supported by a different base station 105, or the first cell may be supported by the same base station 105, or any combination thereof. In some cases, the first cell may be associated with a radio access technology. In some cases, each network may be supported by a different base station 105, or each network may be supported by the same base station 105, or any combination thereof. In one example, the base station 205-*a* and the base station 205-*b* may support a non-standalone 5G network. In some cases, a network may refer to a cell.

Because the UE 215 is configured with two subscriptions, the UE 215 may support communications with two base stations 205 (e.g., base station 205-*a* and base station 205-*b*) at a time. As depicted herein, the UE 215 may be configured to support dual-connectivity or other non-standalone communications schemes. In one example, the UE 215 may communicate with base station 205-*a* associated with a first cell (e.g., an anchor cell) associated with a radio access technology (e.g., a 5G network, an LTE network, or a 4G network) via communication link 220. For example, the UE 215 may establish a connection with the base station 205-*a* for a first subscription and a second subscription via communication link 220. As depicted herein, the UE 215 may establish a connection with the base station 205-*b* over communication link 225. Additionally or alternatively, as the UE 215 is configured to support dual-connectivity, the UE 215 may support communications with two base stations 205 (e.g., two networks) at a time.

In some aspects, the UE 215 may support a dual subscriber identification module dual standby mode (dual-sim dual-standby). The dual-sim dual-standby mode enables devices to receive on two different subscriber identification module subscriptions. A tune-away feature may allow the UE 215 to receive paging on one subscription while remaining active in another subscription (e.g., remaining or initiating a packet switched call in a second subscription). Additionally or alternatively, a dual receive feature may enable simultaneous receive on two technologies on two different subscriptions. In some examples, dual receive may be different than dual active model. Specifically, dual active mode may support a single transmission. In the dual-sim dual-standby mode, the UE 215 may be able to avoid tune-away and receive on two different technologies if they are operating in different bands. This may further depend on the operating modes of the UE 215.

In some examples, the UE 215 may support a dual-receive full-concurrency mode. In such examples, the UE 215 may support a tune-away operation from a first radio access technology in data traffic to a second radio access technology in idle state may be eliminated. In some examples, the UE 215 may be configured to monitor pages on a first subscription without hampering communications on a second subscription. For example, NR frequency range 1 (FR1) may utilize a primary receive path (PRx1), a diversity receive path (DRx1), and a transmit path (TX) on a first subscription and LTE may utilize another primary receive path (PRx2) or different resources for idle-mode operations on a second subscription. Thus, NR may have full receive data capability as well full capability to support MIMO. In some examples, NR FR1 throughput may be unimpacted and communications may be within some statistical variance. In some examples, the UE 215 may support a diversity sharing mode (e.g., diversity tune-away). In the diversity tune-away mode, the first subscription supporting data traffic may lose the secondary RF chain when tech 2 is awake for idle operations. A diversity tune-away may occur due to a restriction on the RF front end and for some band combinations. For example, LTE may utilize PRx1 and Tx and Global System for Mobile Communications (GSM) may utilize DRx1. In some examples, LTE may lose receive diversity (RxD) as well MIMO capabilities for the duration of the tune-away.

A UE may additionally or alternatively operate in accordance with a full tune-away (non-dual receive) or a hybrid fallback mode. In the example of full tune-away, data traffic from a first subscription may be tuned away to a second subscription in idle state. For example, in full tune-away mode, NR traffic on the first subscription may lose RF resources to GSM resources on the second subscription for the duration of activity on the second subscription. The full tune-away or hybrid fallback mode may be invoked when GSM experiences poor paging performance (e.g., when the UE 215 detects three consecutive page decode failures or three transceiver resource manager (TRM) denials for page decode). In such cases, the UE 215 may fall back to a tune-away mode to enhance paging performance. Additionally or alternatively, the full tune-away or hybrid fallback mode may be invoked when GSM enters an access or traffic state for mobile originated/mobile terminated voice call, mobile originated/mobile terminated messaging on traffic channel, and GSM Location Area Update (LAU). In some examples, the full tune-away or hybrid fallback mode may be invoked when a technology enters an acquisition state.

In some systems, a UE 215 may connect to an LTE cell in a non-standalone mode. A non-standalone mode may refer to a deployment of a first radio access technology (e.g., 5G NR) that may use a control plane of another radio access technology (e.g., 4G LTE), whereas the first radio access technology may handle user plane functions. Alternatively, a standalone mode may refer to a single radio access technology used for both control and user plane functions. In some examples, the UE 215 may support dual-connectivity with NR and LTE. Additionally, a dual-SIM UE (e.g., phone) can have two subscriptions.

While operating in the non-standalone mode, the UE 215 may identify or may otherwise be configured with a first set of bands for a first subscription and a second set of bands for a second subscription. In some instances, a UE 215 hardware may be designed such that a first band on the first subscription and a second band on the second subscription has the same downlink path or set of resources. In some examples, UE hardware may support standalone or non-standalone multiple subscriber identification module configuration. In some examples, a first subscription at the UE 215 may support the non-standalone mode or the standalone mode, while a second subscription at the UE 215 may support the standalone mode (e.g., using NR/LTE/WCDMA/GSM/1×). For instance, the first band on the first subscription and a second band on the second subscription may share the same set of RF front end resources. As an illustrative example, the UE 215 may be configured with an LTE B66 band, an LTE B2 band (which may correspond to a secondary component carrier of a carrier aggregation scheme), and an NR n71 band on the first subscription. The UE 215 may be further configured with a WCDMA B2 band on the second subscription. In this example, the n71 band and the WCDMA B2 band may have or share the same RF front-end resources and/or downlink path resulting in a full tune away of the n71 band, for example, during a paging operation on the WCDMA B2 band. In such cases, the full tune away may be enforced on the UE 215 in order to decode paging on the WCDMA B2 band. Such a full tune away of the n71 band may impact communications, for example, high-throughput communications using NR technology on the n71 band, which may lead to degraded performance. Additionally or alternatively, full tune-away at the UE 215 may break multiple subscriber identification module configurations. The performance impact at the UE 215 from the tune away may result in decreased user experience.

However, in some cases, the LTE B2 (downlink secondary component carrier) may be removed (e.g., when the UE 215 was configured with B66 band and n71 band on the first subscription and WB2 band on the second subscription), the n71 and WB2 may use different ports (e.g., SDR ports) and thus n71 may be fully concurrent with WB2. Thus, to mitigate the communications interruptions between a UE (such as UE 215) in a non-standalone mode of operation and a cell, the UE 215 may be configured to support improved communications. As an example, to decrease latency and improve resource efficiency, the UE 215 may determine that a combination of bands are not fully concurrent and that the UE may perform a full tune away when communicating using the combination of bands. The UE 215 may then refrain from communicating on one of the bands from the determined combination of bands. In some examples, if an LTE secondary component carrier is configured (may or may not be activated) for the first subscription, the UE 215 may drop the secondary component carrier, which may enable the UE 215 to perform a paging operation on the second subscription without a full tune away. In some examples, the UE 215 may deprioritize some combination of bands which causes the UE to switch to a full tune away mode when activated. In some examples, the UE 215 may determine that a combination of bands causes the UE215 to switch to a full tune away mode. In such examples, the UE 215 may remove advertising of such combination in a capability report.

According to one or more aspects or the present disclosure, the UE 215 may be configured to run in full concurrency mode to enhance throughput or performance. In some cases, running in full concurrency mode when configured with, for example, NR sub-6 GHz bands may enhance the performance at the UE 215 and the NR sub-6 GHz bands support higher bandwidth or throughput. To achieve full concurrency, the UE 215 may identify which bands or carrier aggregation or dual connectivity combinations are fully concurrent and which bands are associated with a full tune-away at the UE 215. For example, the UE 215 may identify a first set of bands associated with a first subscription (SIM 207) and may identify a second set of bands associated with a second subscription (SIM 210) different from the first subscription. The UE 215 may then determine that a first band from the first set of bands and a second band from the second set of bands share a set of RF front-end resources, where a third band from the first set of bands is associated with a secondary component carrier of a multi-carrier communications scheme. The UE 215 may refrain from communicating on the third band while communicating (e.g., simultaneously) on a remaining set of bands from the first set of bands as well as the second set of bands. For instance, the UE 215 may refrain from communicating based on determining that the first band from the first set of bands and the second band from the second set of bands share the set of RF front-end resources and the third band being associated with the secondary component carrier.

In some examples, if the UE 215 determines that the secondary component carrier is configured but not activated, then the UE 215 may drop that secondary component carrier which causes the UE 215 to perform a full tune-away to read pages on the second subscription (SIM 210). For example, the UE 215 may determine that the third band is configured as the secondary component carrier. The UE 215 may further determine an absence of control signaling activating the third band associated with the secondary component carrier. In such examples, the UE 215 may refrain from communicating on the third band, which may include dropping the third band associated with the secondary component carrier based on the absence of the control signaling activating the third.

According to one or more aspects, the UE 215 may drop an activated secondary component carrier. For example, the UE 215 may receive, from the base station 205-a, control signaling activating the third band associated with the secondary component carrier on the first subscription (SIM 207). The UE 215 may determine that the third band associated with the secondary component carrier and is activated based on receiving the control signaling. In such examples, the UE 215 may drop the third band associated with the secondary component carrier based on determining that the first band from the first set of bands and the second band from the second set of bands share the set of RF front-end resources and the third band being activated. The UE 215 may drop the secondary component carrier locally or by reporting compensated measurement so that the network de-configures the secondary component carrier. For example, the UE 215 may report (e.g., to the base station 205-a) a compensated measurement on the third band associated with the secondary component carrier based on determining that the first band from the first set of bands and the second band from the second set of bands share the set of RF front-end resources and the third band being activated. In some aspects, the UE 215 may drop the third band based on the reported compensated measurement.

Techniques described herein may provide for the UE 215 identifying a number of resource grants associated with the secondary component carrier based on the third band being activated. In some examples, the UE 215 may drop the third band based on the identified number of resource grants associated with the secondary component carrier. That is, the UE 215 may determine whether to drop an activated secondary component carrier based on resource block grants on secondary component carrier which is blocking full concurrency at the UE 215.

In some examples, the UE 215 may deprioritize the third band from the first set of bands based on determining that the first band from the first set of bands and the second band from the second set of bands share the set of RF front-end resources. For instance, the UE 215 may deprioritize a carrier aggregation combination (including the secondary component carrier) which causes the UE 215 to perform a full tune-away operation. In such cases, the UE 215 may transmit no measurements or compensated measurements for the band. That is, the UE 215 may report a compensated measurement on the third band from the first set of bands (e.g., corresponding to a secondary component carrier) based on determining that the first band from the first set of bands and the second band from the second set of bands share the set of RF front-end resources. Alternatively, the UE 215 may refrain from reporting a measurement on the first band from the first set of bands based on determining that the first band from the first set of bands and the second band from the second set of bands share the set of RF front-end resources.

In some examples, the UE 215 may simultaneously communicate on a remaining set of bands for the first subscription of the UE 215 and the second set of bands for the second subscription of the UE 215 based on refraining from communicating on the first band associated with the secondary component carrier. Additionally or alternatively, the UE 215 may determine that a combination of the first band and the third band from the first set of bands and the second band from the second set of bands may be associated with a full tune-away operation with the second subscription (SIM 207) at the UE 215.

In some examples, the UE 215 may transmit, to the base station 205-a, a capability report excluding a combination of bands that may be associated with the full tune away (e.g., the first band and the third band). The UE 215 may transmit the capability report based on determining that the first band from the first set of bands and the second band from the second set of bands share the set of RF front-end resources. That is, the UE 215 may identify a set of multiple combinations of the first set of bands and the second set of bands for communicating with the base station. The UE 215 may then transmit the capability report including a remaining number of combinations of the set of multiple combinations of the first set of bands and the second set of bands. The techniques described herein may thus provide for improved throughput and performance due to the UE 215 operating in full-concurrency mode. Additionally or alternatively, the techniques described herein provides for improved power usage due to less retransmission and in turn provides enhanced user experience. Further, the techniques may avoid modifications to the hardware of the UE 215, which may be costly and undesirable.

Figure 3:
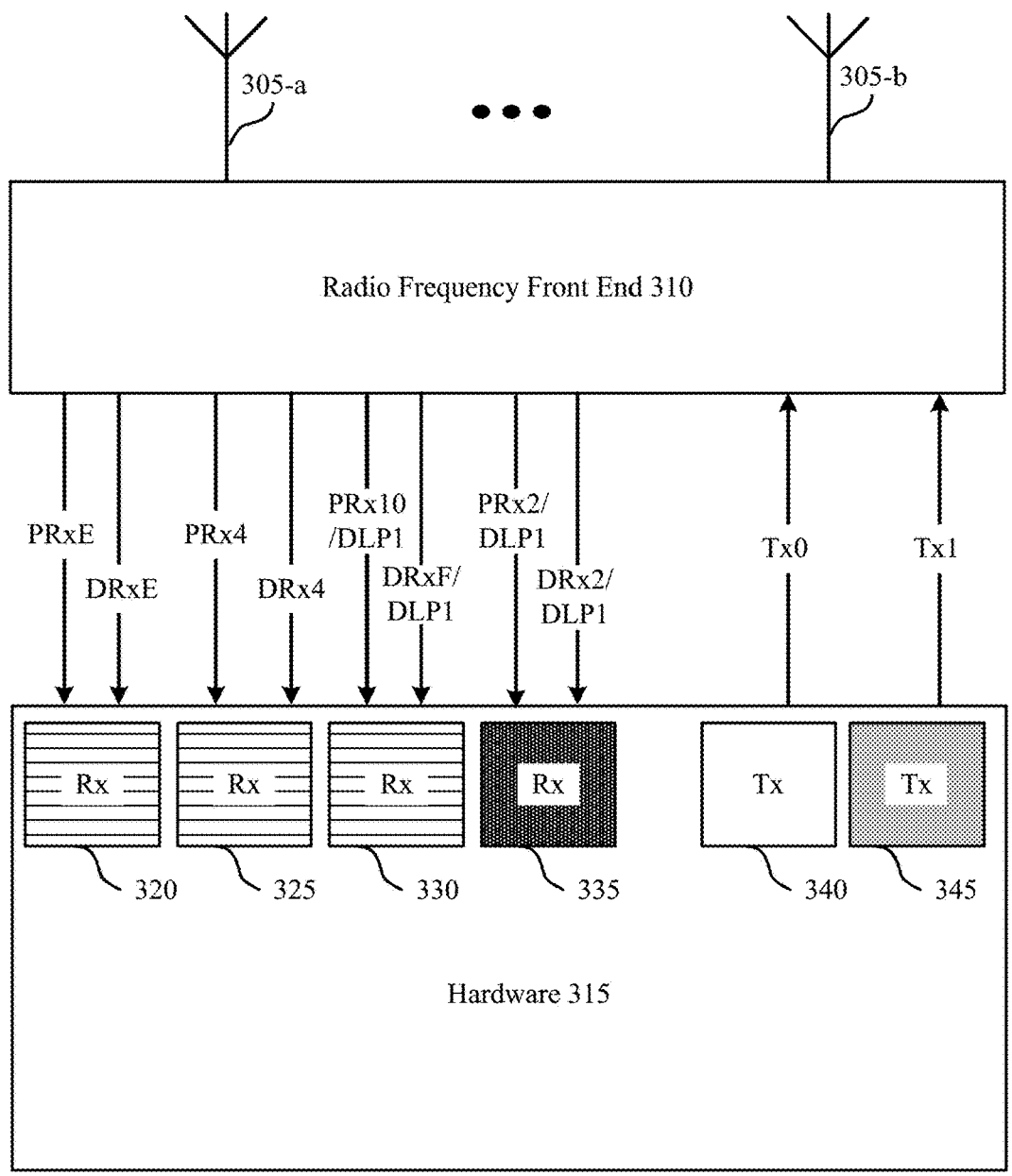
FIG. 3 illustrates an example of a hardware configuration that supports techniques for enhancing user equipment performance for multiple subscriber identification module operation in accordance with aspects of the present disclosure.

FIG. 3 illustrates an example of a hardware configuration 300 that supports techniques for enhancing user equipment performance for multiple subscriber identification module operation in accordance with aspects of the present disclosure. In some examples, the hardware configuration 300 may implement aspects of the wireless communications system 100 and the wireless communications system 200. The hardware configuration 300 may be included in a UE, which may be examples of UE 115 as described with reference to FIG. 1 or a UE 215 described with reference to FIG. 2. The hardware configuration 300 may be included in a UE configured to support multiple subscriber identification module functionality.

As depicted in the example of FIG. 3, the hardware configuration 300 include a hardware portion 315 and a RF front end 310. The RF front end 310 may be coupled with a first antenna 305-a and a second antenna 305-b. While two antennas 305 are illustrated, the hardware configuration 300 may include a different number of antennas 305. In some examples, the RF front end 310 may be configured to transmit or receive communication using the first antenna 305-a and the second antenna 305-b. Although two antennas are depicted in the example of FIG. 3, it may be understood that any number of antennas may be coupled with the RF front end 310. The hardware portion 315 may be an example of one or more processors and/or system on chip (SoC) (e.g., a SoC having some advanced reduced instruction set computing (RISC) machine (ARM) architecture). The hardware portion may provide functionality for transmitting and receiving signals, for example, through the RF front end 310.

In some examples, the UE may identify or be otherwise be configured with a first set of bands associated with the first subscription. Additionally or alternatively, the UE may identify or be otherwise configured with a second set of bands associated with the second subscription different from the first subscription. In the example of FIG. 3, the UE may be configured with a first band 320, a second band 325 and a third band 330 associated with the first subscription. The UE may also be configured with a fourth band 335 associated with the second subscription. The band 340 and the band 345 may be associated with transmission from the UE (using first subscription or second subscription or both). In some cases, the first band 320 may be associated with a secondary component carrier (e.g., a downlink secondary component carrier) of a multi-carrier communications scheme.

According to one or more aspects, the UE may determine that the third band 330 from the first set of bands and the fourth band from the second set of bands share a set of RF front-end resources (e.g., DLP1). In one example, the first band 320 may correspond to an LTE B2 band, the second band 325 may correspond to an LTE B66 band, the third band 330 may correspond to an NR n71 band, and the fourth band 335 may correspond to a WCDMA B2 band. In such cases, the UE may determine that the combination of the first band 320 and the fourth band 335 causes the UE to perform a full tune-away operation, as the first band 320 and the fourth band 335 may share a same set of RF front end resources. It is noted that the examples of the bands described herein are provided for illustrative purposes, and should not be considered limiting. That is, other bands associated with other radio access technologies may be possible, and the examples provided herein are some possible bands that may be used.

Upon determining that the third band 330 and the fourth band 335 share a common set of RF front-end resources (e.g., DLP1), the UE may refrain from communicating on the first band 320, which may also be configured as the downlink secondary component carrier. For example, the UE may drop communications on the first band 320 upon determining that the third band 330 and the fourth band 335 share the common set of RF front-end resources. In some examples, instead of dropping, the UE may report a compensated measurement on the first band 320. By avoiding communications on the first band 320, the UE may avoid a full tune-away operation resulting in enhanced performance. For example, dropping and/or deprioritizing communications on the first band may free up resources for communications on the fourth band 335, which may likewise avoid the full tune away on the third band 330. Specifically, dropping the first band 320 may enable different ports (e.g., SDR ports) to be used between the two subscriptions, and the third band 330 and the fourth band 335 may be fully concurrent as a result.

Figure 4:
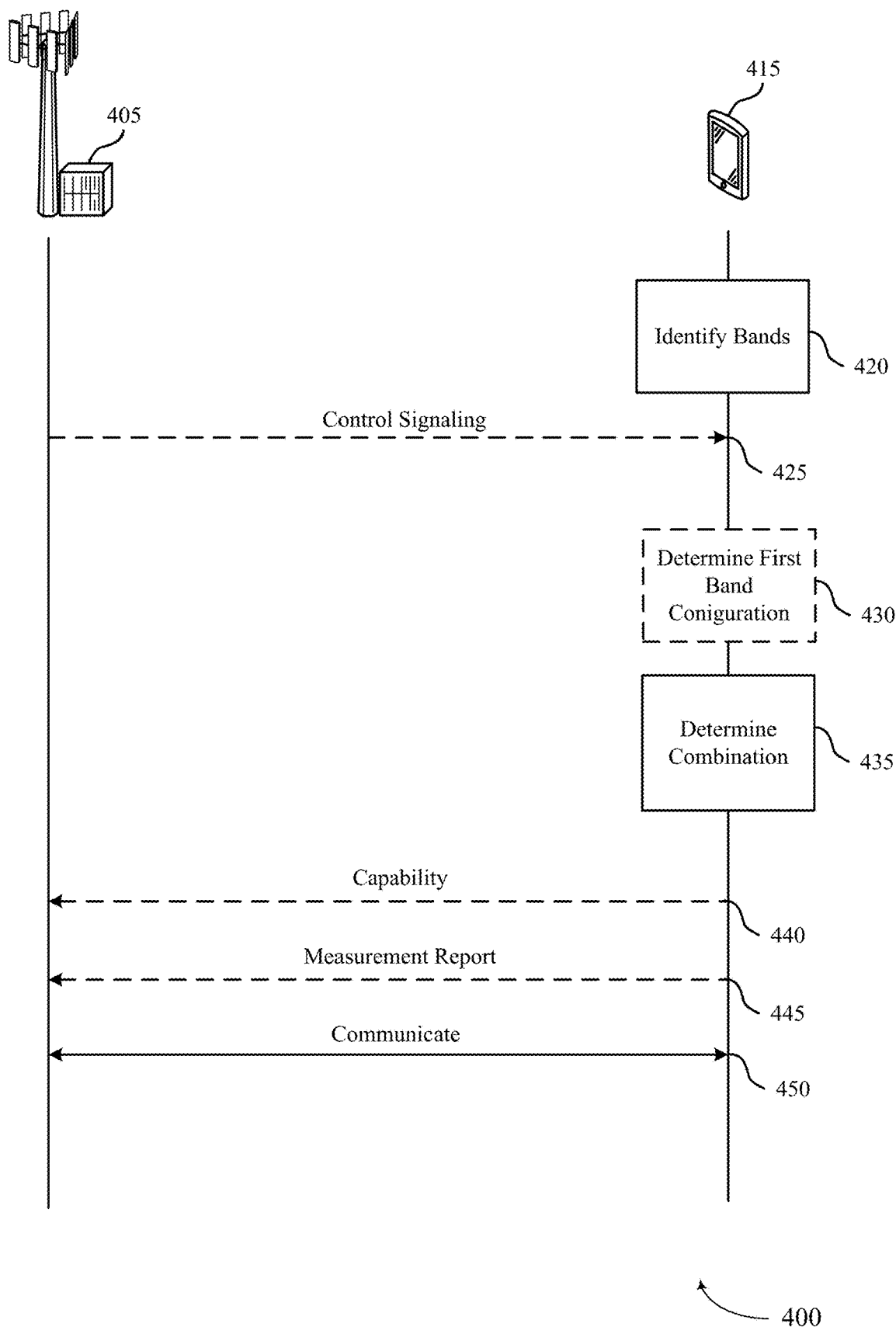
FIG. 4 illustrates an example of a process flow in a system that supports techniques for enhancing user equipment performance for multiple subscriber identification module operation in accordance with aspects of the present disclosure.

FIG. 4 illustrates an example of a process flow 400 in a system that supports techniques for enhancing user equipment performance for multiple subscriber identification module operation in accordance with aspects of the present disclosure. In some examples, process flow 400 may implement aspects of wireless communications system 100 and wireless communications system 200. A UE 415 may be an example of a UE 115 described with reference to FIGS. 1 and 2 and a base station 405 may be an example of a base station 105 described with reference to FIGS. 1 and 2.

In the following description of the process flow 400, the operations between the base station 405 and the UE 415 may be transmitted in a different order than the exemplary order shown. The operations performed by the base station 405 or the UE 415 may be performed in different orders or at different times than the exemplary order shown. Some operations may also be omitted from the process flow 400, or other operations may be added to the process flow 400. Further, the base station 405 and the UE 415 are not limiting, as the present disclosure may be associated with any number of different devices.

At 420, the UE 415 may identify a first set of bands associated with a first subscription. The UE 415 may also identify a second set of bands associated with a second subscription different from the first subscription. In some examples, a communication state for the first band (or the first set of bands) may include a dual-connectivity mode, and a communication state for the second band (or the second set of bands) may include an idle mode. In some examples, the first subscription may be associated with a multi-carrier operation (e.g., carrier aggregation) and the second subscription may be associated with a single-carrier operation.

At 425, the base station 405 may optionally transmit control signaling to the UE 415. The UE 415 may receive, from the base station 405, the control signaling activating a band associated with a secondary component carrier. For example, a third band from the first set of bands (and associated with the first subscription) may be activated as the secondary component carrier of a multi-carrier communications scheme or deployment. In some examples, the secondary component carrier may be a downlink secondary component carrier.

At 430, the UE 415 may optionally determine that the third band is configured as the secondary component carrier. In some examples, the UE 415 may additionally determine an absence of control signaling activating the third band associated with the secondary component carrier. Additionally or alternatively, the UE 415 may determine that the third band associated with the secondary component carrier is activated based on receiving the control signaling.

At 435, the UE 415 may determine that at least a first band from the first set of bands and at least a second band from the second set of bands share a same set of RF front-end resources. As described herein, the first band and the second band sharing the same RF front-end resources may result in a full tune away operation, which may impact communications efficiency at the UE 415. As such, the UE 415 may perform techniques to enable full concurrency between bands of the different subscriptions, which may, for example, include dropping or deprioritizing another band from the first subscription (e.g., from the first set of bands). Here, the third band corresponding to the secondary component carrier may be dropped or deprioritized.

At 440, the UE 415 may optionally transmit, to the base station 405, a capability report that excludes multi-carrier combinations, which may involve excluding a combination of the first band and the third band based on determining that the first band from the first set of bands and the second band from the second set of bands share the set of RF front-end resources. Put another way, the first band and the third band may be associated with multi-carrier operations (e.g., carrier aggregation), and because of the resource conflict caused between the first band and the second band, the UE 415 may exclude the combination of the first band and the third band (e.g., both from the first set of bands and associated with the same subscription) in a capability report to the base station 405. Additionally or alternatively, the UE 415 may identify a set of combinations of the first set of bands and the second set of bands for communicating with the base station. In some examples, a combination of the first band and the second band may be included in the set of combinations. The UE 415 may then transmit the capability report including a remaining number of combinations of the set of combinations of the first set of bands and the second set of bands.

In some examples, at 445, the UE 415 may report a compensated measurement on the third band associated with the secondary component carrier based on determining that at least the first band from the first set of bands and at least the second band from the second set of bands share the set of RF front-end resources and the third band being activated. In some examples, the third band may be dropped based on the reported compensated measurement.

In some instances, the UE 415 may identify a number of resource grants associated with the secondary component carrier based on the third band being activated. In some examples, the third band may be dropped based on the identified number of resource grants associated with the secondary component carrier.

Additionally or alternatively, the UE 415 may deprioritize the third band from the first set of bands based on determining that the first band from the first set of bands and the second band from the second set of bands share the set of RF front-end resources. The UE 415 may then report a compensated measurement (e.g., at 445) on the third band from the first set of bands based on determining that the first band from the first set of bands and the second band from the second set of bands share the set of RF front-end resources. Although not depicted in the example of FIG. 4, it may be understood that the UE 415 may refrain from reporting a measurement on the third band from the first set of bands based on determining that the first band from the first set of bands and the second band from the second set of bands share the set of RF front-end resources.

At 450, the UE 415 may communicate with the base station 405. For example, the UE 415 may refrain from communicating on the third band while communicating on a remaining set of bands for the first subscription of the UE (e.g., a remaining set of bands from the first set of bands) and the second set of bands for the second subscription of the UE based on refraining from communicating on the first band associated with the secondary component carrier. In some examples, refraining from communicating on the third band may be based on determining that the first band from the first set of bands and the second band from the second set of bands share the set of RF front-end resources and the third band being associated with the secondary component carrier. In some aspects, the UE 415 may drop the third band associated with the secondary component carrier based on determining that the first band from the first set of bands and the second band from the second set of bands share the set of RF front-end resources and the first band being activated. When communicating on the bands (e.g., excluding the third band), the UE 415 may simultaneously communicate on the remaining set of bands for the first subscription of the UE (e.g., a remaining set of bands from the first set of bands) and the second set of bands for the second subscription of the UE.

Figure 5:
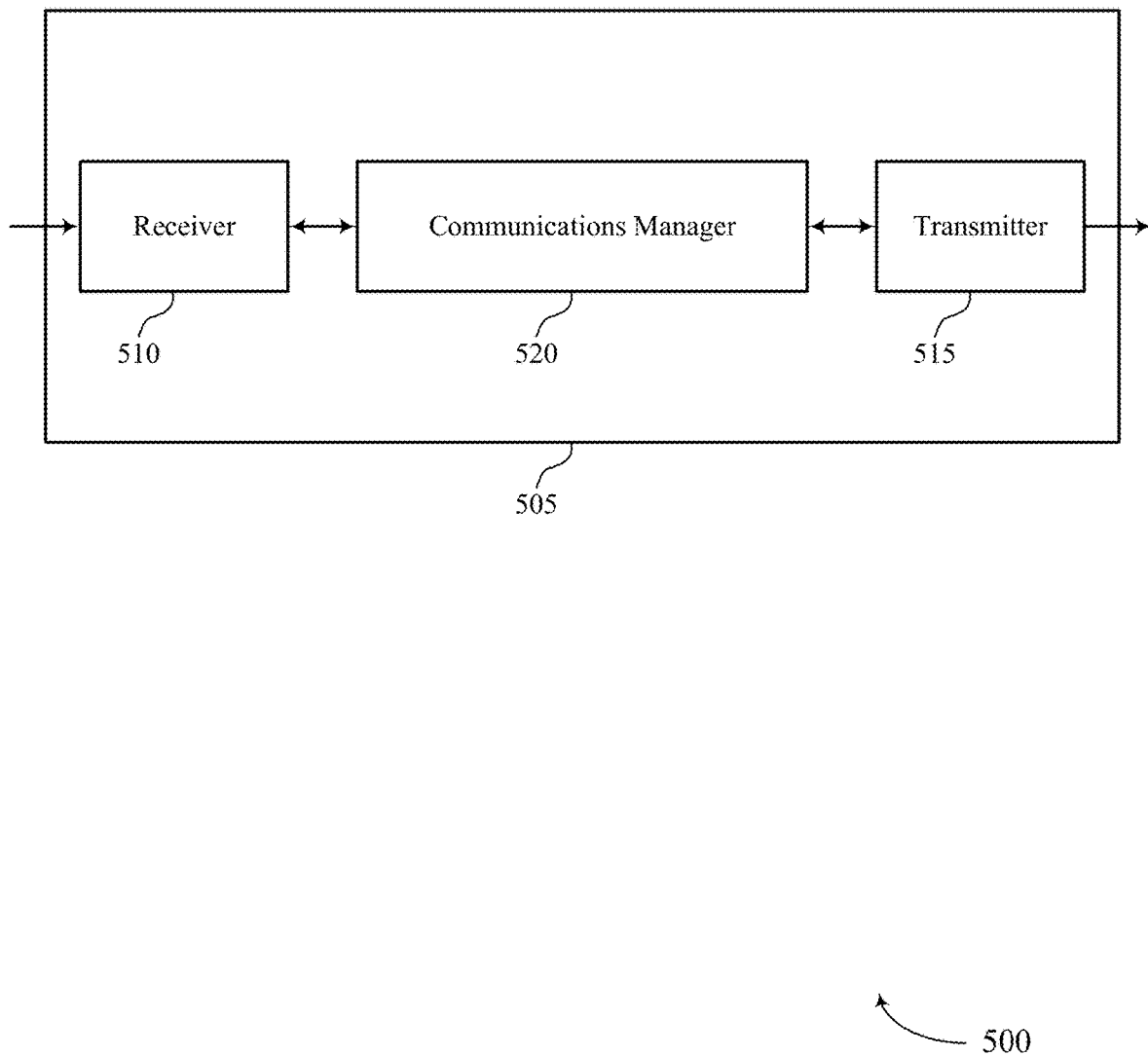
FIGS. 5 and 6 show block diagrams of devices that support techniques for enhancing user equipment performance for multiple subscriber identification module operation in accordance with aspects of the present disclosure.

FIG. 5 shows a block diagram 500 of a device 505 that supports techniques for enhancing user equipment performance for multiple subscriber identification module operation in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for enhancing user equipment performance for multiple subscriber identification module operation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for enhancing user equipment performance for multiple subscriber identification module operation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for enhancing user equipment performance for multiple subscriber identification module operation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for identifying a first set of bands associated with a first subscription. The communications manager 520 may be configured as or otherwise support a means for identifying a second set of bands associated with a second subscription different from the first subscription. The communications manager 520 may be configured as or otherwise support a means for determining that a first band from the first set of bands and a second band from the second set of bands share a set of radio frequency front-end resources. The communications manager 520 may be configured as or otherwise support a means for refraining from communicating on a third band from the first set of bands, the third band being associated with a secondary component carrier of a multi-carrier communications scheme, where refraining from communicating on the third band is based on determining that the first band and the second band share the set of radio frequency front-end resources and the third band being associated with the secondary component carrier. The communications manager 520 may be configured as or otherwise support a means for communicating on a remaining set of bands from the first set of bands and the second set of bands based on refraining from communicating on the third band.

Additionally or alternatively, the communications manager 520 may support wireless communications at a UE in accordance with examples as disclosed herein. For example, the communications manager 520 may be configured as or otherwise support a means for identifying a first set of bands associated with a first subscription. The communications manager 520 may be configured as or otherwise support a means for identifying a second set of bands associated with a second subscription different from the first subscription. The communications manager 520 may be configured as or otherwise support a means for determining that a first band from the first set of bands and a second band from the second set of bands share a set of radio frequency front-end resources. The communications manager 520 may be configured as or otherwise support a means for transmitting, to a base station, a capability report excluding the first band and a third band from the first set of bands based on determining that the first band and the second band share the set of radio frequency front-end resources, the third band being associated with a secondary component carrier of a multi-carrier communications scheme.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for higher throughput, better performance, reduced processing, reduced power consumption, more efficient utilization of communication resources.

Figure 6:
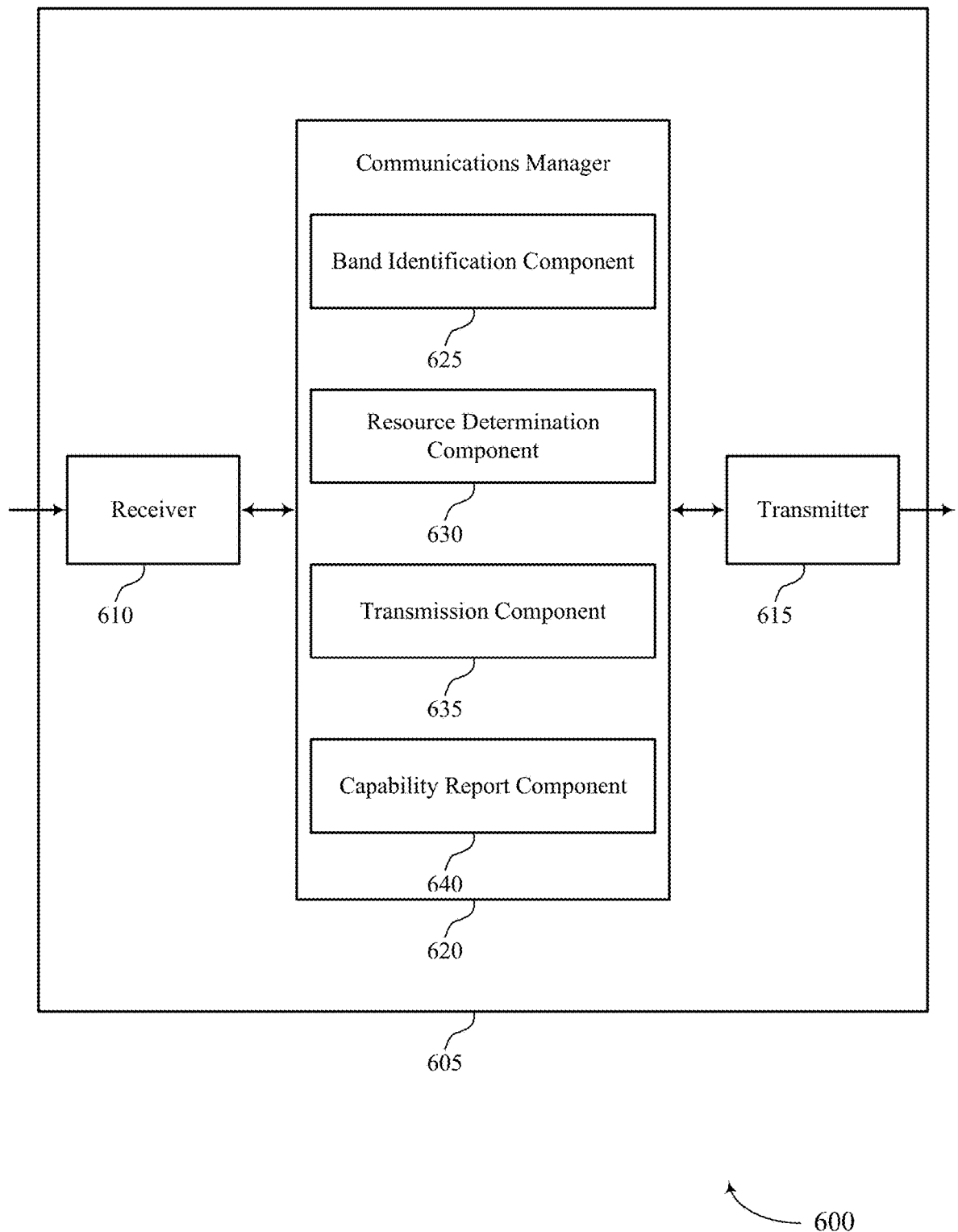

FIG. 6 shows a block diagram 600 of a device 605 that supports techniques for enhancing user equipment performance for multiple subscriber identification module operation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for enhancing user equipment performance for multiple subscriber identification module operation). Information may be passed on to other components of the device 605. The receiver 610 may utilize a single antenna or a set of multiple antennas.

The transmitter 615 may provide a means for transmitting signals generated by other components of the device 605.

For example, the transmitter 615 may transmit information such as packets, user data, control information, or any combination thereof associated with various information channels (e.g., control channels, data channels, information channels related to techniques for enhancing user equipment performance for multiple subscriber identification module operation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for enhancing user equipment performance for multiple subscriber identification module operation as described herein. For example, the communications manager 620 may include a band identification component 625, a resource determination component 630, a transmission component 635, a capability report component 640, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The band identification component 625 may be configured as or otherwise support a means for identifying a first set of bands associated with a first subscription. The band identification component 625 may be configured as or otherwise support a means for identifying a second set of bands associated with a second subscription different from the first subscription. The resource determination component 630 may be configured as or otherwise support a means for determining that a first band from the first set of bands and a second band from the second set of bands share a set of radio frequency front-end resources. The transmission component 635 may be configured as or otherwise support a means for refraining from communicating on a third band from the first set of bands, the third band being associated with a secondary component carrier of a multi-carrier communications scheme, where refraining from communicating on the third band is based on determining that the first band and the second band share the set of radio frequency front-end resources and the third band being associated with the secondary component carrier. The transmission component 635 may be configured as or otherwise support a means for communicating on a remaining set of bands from the first set of bands and the second set of bands based on refraining from communicating on the third band.

In some examples, the band identification component 625 may be configured as or otherwise support a means for identifying a first set of bands associated with a first subscription. The band identification component 625 may be configured as or otherwise support a means for identifying a second set of bands associated with a second subscription different from the first subscription. The resource determination component 630 may be configured as or otherwise support a means for determining that a first band from the first set of bands and a second band from the second set of bands share a set of radio frequency front-end resources. The capability report component 640 may be configured as or otherwise support a means for transmitting, to a base station, a capability report excluding the first band and a third band from the first set of bands based on determining that the first band and the second band share the set of radio frequency front-end resources, the third band being associated with a secondary component carrier of a multi-carrier communications scheme.

Figure 7:
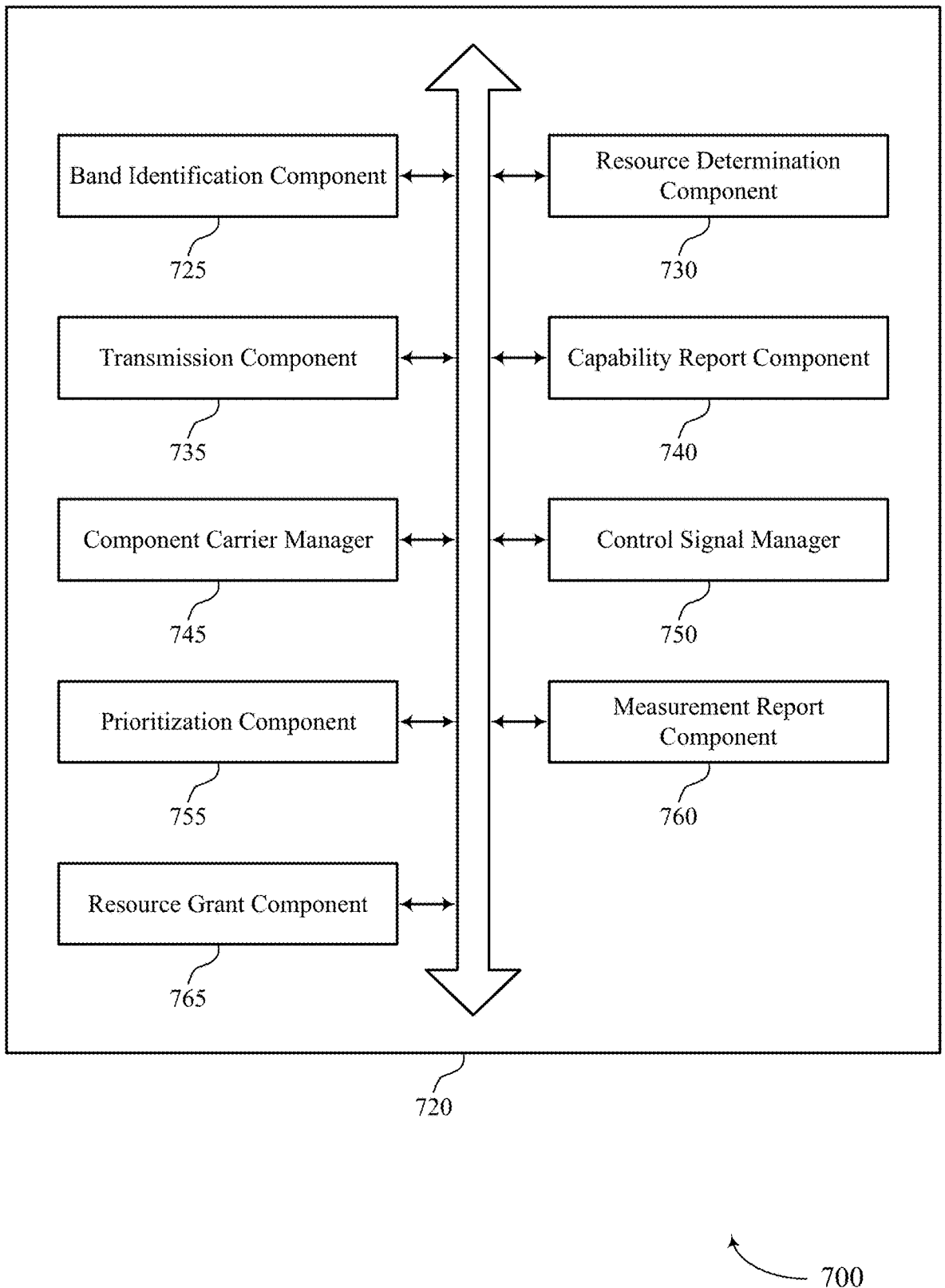
FIG. 7 shows a block diagram of a communications manager that supports techniques for enhancing user equipment performance for multiple subscriber identification module operation in accordance with aspects of the present disclosure.

FIG. 7 shows a block diagram 700 of a communications manager 720 that supports techniques for enhancing user equipment performance for multiple subscriber identification module operation in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for enhancing user equipment performance for multiple subscriber identification module operation as described herein. For example, the communications manager 720 may include a band identification component 725, a resource determination component 730, a transmission component 735, a capability report component 740, a component carrier manager 745, a control signal manager 750, a prioritization component 755, a measurement report component 760, a resource grant component 765, or any combination thereof. Each of these components may communicate, directly or indirectly, with one another (e.g., via one or more buses).

The communications manager 720 may support wireless communication at a UE in accordance with examples as disclosed herein. The band identification component 725 may be configured as or otherwise support a means for identifying a first set of bands associated with a first subscription. In some examples, the band identification component 725 may be configured as or otherwise support a means for identifying a second set of bands associated with a second subscription different from the first subscription. The resource determination component 730 may be configured as or otherwise support a means for determining that a first band from the first set of bands and a second band from the second set of bands share a set of radio frequency front-end resources. The transmission component 735 may be configured as or otherwise support a means for refraining from communicating on a third band from the first set of bands, the third band being associated with a secondary component carrier of a multi-carrier communications scheme, where refraining from communicating on the third band is based on determining that the first band and the second band share the set of radio frequency front-end resources and the third band being associated with the secondary component carrier. In some examples, the transmission component 735 may be configured as or otherwise support a means for communicating on a remaining set of bands from the first set of bands and the second set of bands based on refraining from communicating on the third band.

In some examples, the component carrier manager 745 may be configured as or otherwise support a means for determining that the third band is configured as the secondary component carrier. In some examples, the component carrier manager 745 may be configured as or otherwise support a means for determining an absence of control signaling activating the third band associated with the secondary component carrier, where refraining from communicating on the third band includes dropping the third band based on the absence of the control signaling activating the third band associated with the secondary component carrier.

In some examples, the control signal manager 750 may be configured as or otherwise support a means for receiving, from a base station, control signaling activating the third band associated with the secondary component carrier. In some examples, the component carrier manager 745 may be configured as or otherwise support a means for determining that the third band associated with the secondary component carrier and is activated based on receiving the control signaling.

In some examples, to support refraining from communicating on the third band, the control signal manager 750 may be configured as or otherwise support a means for dropping the third band associated with the secondary component carrier based on determining that the first band from the first set of bands and the second band from the second set of bands share the set of radio frequency front-end resources and the third band being activated.

In some examples, to support refraining from communicating on the third band, the measurement report component 760 may be configured as or otherwise support a means for reporting a compensated measurement on the third band associated with the secondary component carrier based on determining that the first band from the first set of bands and the second band from the second set of bands share the set of radio frequency front-end resources and the third band being activated, where the third band is dropped based on the reported compensated measurement.

In some examples, the resource grant component 765 may be configured as or otherwise support a means for identifying a number of resource grants associated with the secondary component carrier based on the third band being activated, where the third band is dropped based on the identified number of resource grants associated with the secondary component carrier.

In some examples, the prioritization component 755 may be configured as or otherwise support a means for deprioritizing the third band from the first set of bands based on determining that the first band from the first set of bands and the second band from the second set of bands share the set of radio frequency front-end resources.

In some examples, to support deprioritizing the third band, the measurement report component 760 may be configured as or otherwise support a means for reporting a compensated measurement on the third band from the first set of bands based on determining that the first band from the first set of bands and the second band from the second set of bands share the set of radio frequency front-end resources.

In some examples, to support deprioritizing the third band, the measurement report component 760 may be configured as or otherwise support a means for refraining from reporting a measurement on the third band from the first set of bands based on determining that the first band from the first set of bands and the second band from the second set of bands share the set of radio frequency front-end resources.

In some examples, the transmission component 735 may be configured as or otherwise support a means for simultaneously communicating on the remaining set of bands for the first subscription and the second set of bands for the second subscription based at least in part on refraining from communicating on the third band associated with the secondary component carrier.

In some examples, to support determining that the first band from the first set of bands and the second band from the second set of bands share the set of radio frequency front-end resources, the resource determination component 730 may be configured as or otherwise support a means for determining that a combination of at least the first band, the second band, and the third band is associated with a full tune-away operation from the first subscription.

In some examples, the UE is configured to operate in a non-standalone mode of operation using the first set of bands. In some examples, the first subscription is associated with a multi-carrier operation and the second subscription is associated with a single-carrier operation. In some examples, a communication state for the first set of bands includes a dual-connectivity mode and a communication state for the second set of bands includes an idle mode.

Additionally or alternatively, the communications manager 720 may support wireless communication at a UE in accordance with examples as disclosed herein. In some examples, the band identification component 725 may be configured as or otherwise support a means for identifying a first set of bands associated with a first subscription. In some examples, the band identification component 725 may be configured as or otherwise support a means for identifying a second set of bands associated with a second subscription different from the first subscription. In some examples, the resource determination component 730 may be configured as or otherwise support a means for determining that a first band from the first set of bands and a second band from the second set of bands share a set of radio frequency front-end resources. The capability report component 740 may be configured as or otherwise support a means for transmitting, to a base station, a capability report excluding the first band and a third band from the first set of bands based on determining that the first band and the second band share the set of radio frequency front-end resources, the third band being associated with a secondary component carrier of a multi-carrier communications scheme.

In some examples, the band identification component 725 may be configured as or otherwise support a means for identifying a set of multiple combinations of bands from the first set of bands and the second set of bands for communicating with the base station, where a combination of the first band and the second band is included in the set of multiple combinations.

In some examples, to support transmitting the capability report, the capability report component 740 may be configured as or otherwise support a means for transmitting the capability report including a remaining number of combinations of the set of multiple combinations of bands from the first set of bands and the second set of bands.

In some examples, the transmission component 735 may be configured as or otherwise support a means for refraining from communicating on the third band based on transmitting the capability report excluding the first band and the third band.

In some examples, the UE is configured to operate in a non-standalone mode of operation. In some examples, the first subscription is associated with a multi-carrier operation and the second subscription is associated with a single-carrier operation. In some examples, a communication state for the first set of bands includes a dual-connectivity mode a communication state for the second set of bands includes an idle mode.

Figure 8:
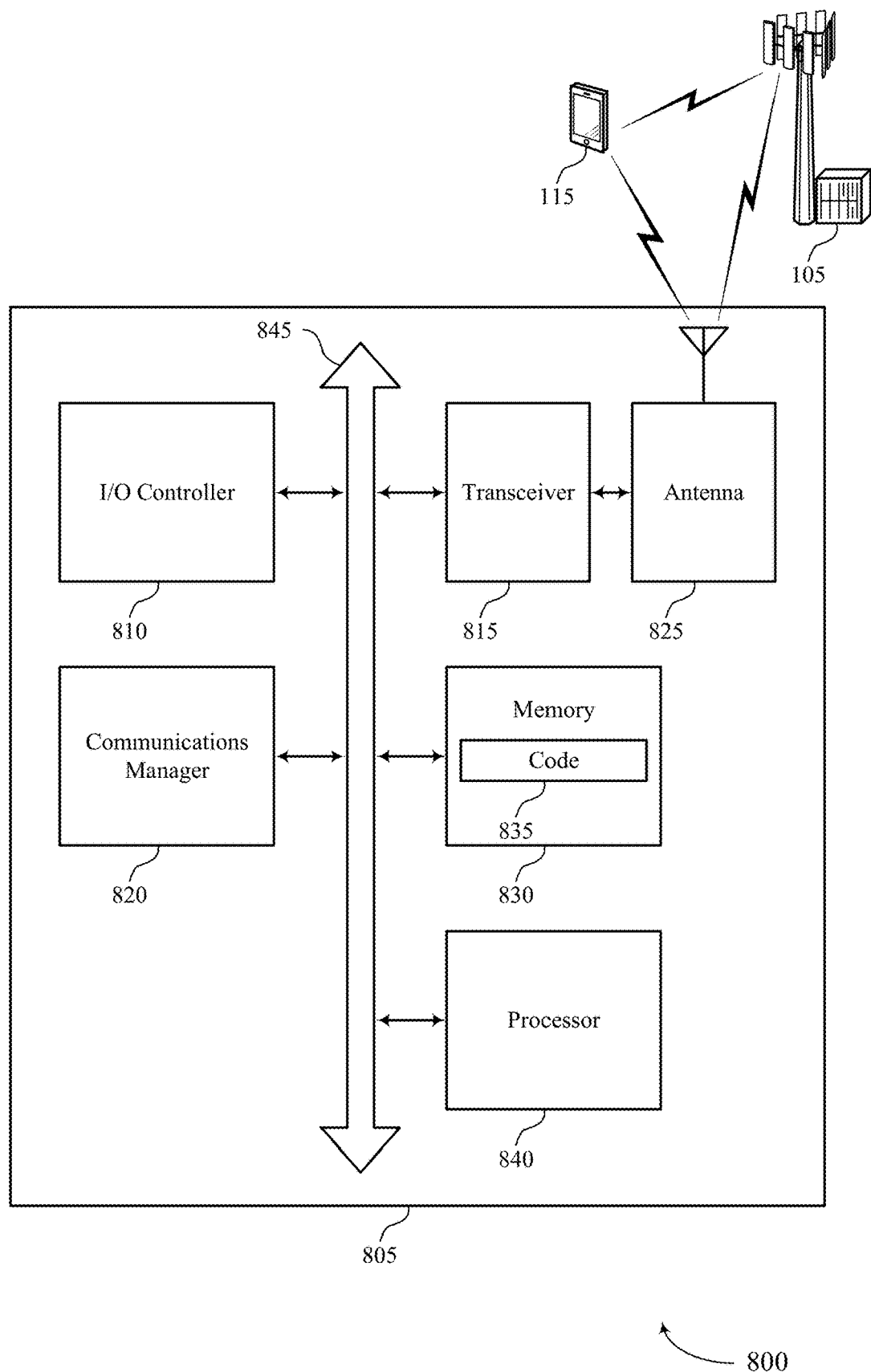
FIG. 8 shows a diagram of a system including a device that supports techniques for enhancing user equipment performance for multiple subscriber identification module operation in accordance with aspects of the present disclosure.

FIG. 8 shows a diagram of a system 800 including a device 805 that supports techniques for enhancing user equipment performance for multiple subscriber identification module operation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for enhancing user equipment performance for multiple subscriber identification module operation). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for identifying a first set of bands associated with a first subscription. The communications manager 820 may be configured as or otherwise support a means for identifying a second set of bands associated with a second subscription different from the first subscription. The communications manager 820 may be configured as or otherwise support a means for determining that a first band from the first set of bands and a second band from the second set of bands share a set of radio frequency front-end resources. The communications manager 820 may be configured as or otherwise support a means for refraining from communicating on a third band from the first set of bands, the third band being associated with a secondary component carrier of a multi-carrier communications scheme, where refraining from communicating on the third band is based on determining that the first band and the second band share the set of radio frequency front-end resources and the third band being associated with the secondary component carrier. The communications manager 820 may be configured as or otherwise support a means for communicating on a remaining set of bands from the first set of bands and the second set of bands based on refraining from communicating on the third band.

Additionally or alternatively, the communications manager 820 may support wireless communication at a UE in accordance with examples as disclosed herein. For example, the communications manager 820 may be configured as or otherwise support a means for identifying a first set of bands associated with a first subscription. The communications manager 820 may be configured as or otherwise support a means for identifying a second set of bands associated with a second subscription different from the first subscription. The communications manager 820 may be configured as or otherwise support a means for determining that a first band from the first set of bands and a second band from the second set of bands share a set of radio frequency front-end resources. The communications manager 820 may be configured as or otherwise support a means for transmitting, to a base station, a capability report excluding the first band and a third band from the first set of bands based on determining that the first band and the second band share the set of radio frequency front-end resources, the third band being associated with a secondary component carrier of a multi-carrier communications scheme.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for enhancing user equipment performance for multiple subscriber identification module operation as described herein, or the processor 840 and the memory 830 may be otherwise configured to perform or support such operations.

Figure 9:
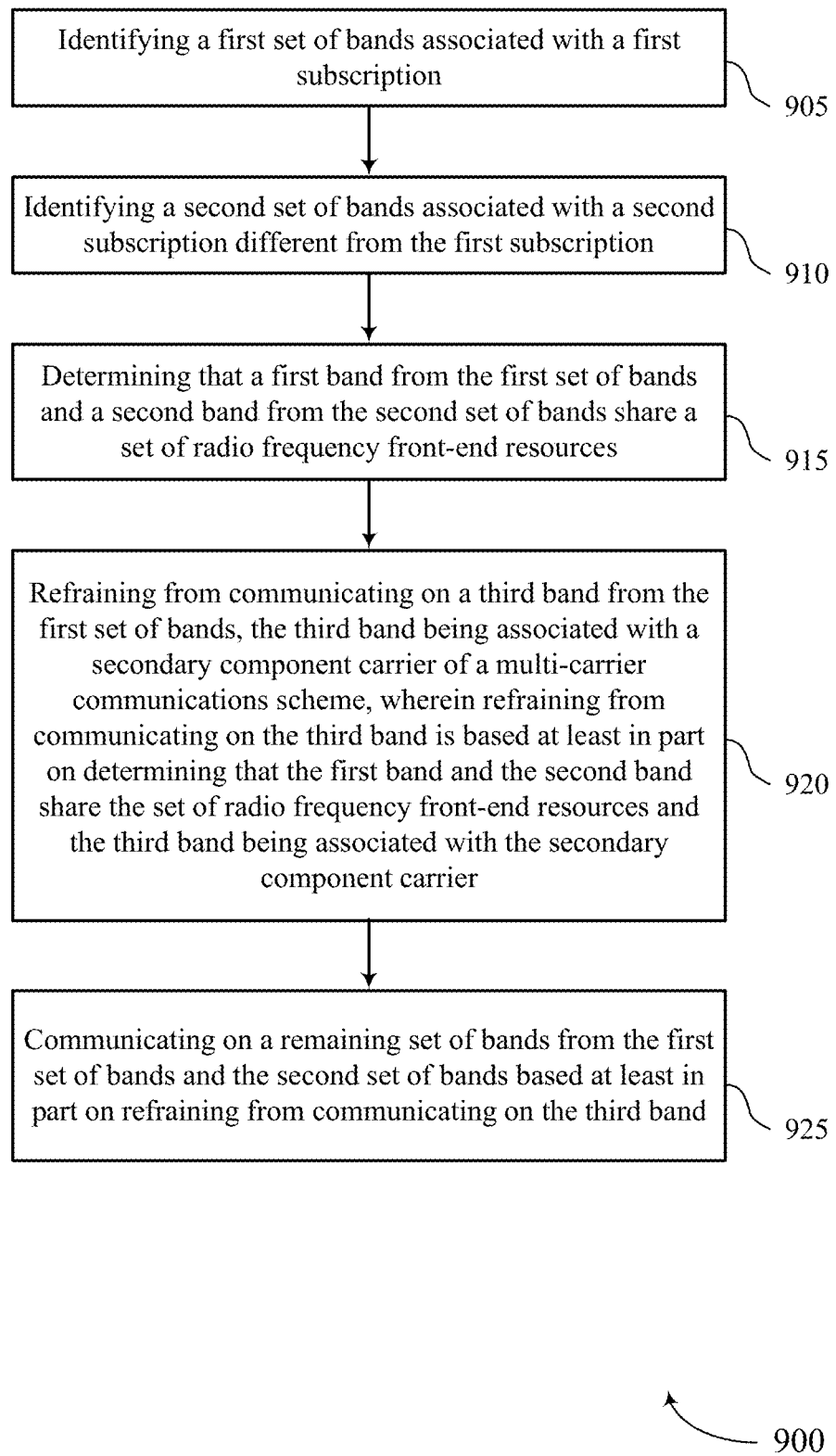
FIGS. 9 through 13 show flowcharts illustrating methods that support techniques for enhancing user equipment performance for multiple subscriber identification module operation in accordance with aspects of the present disclosure.

FIG. 9 shows a flowchart illustrating a method 900 that supports techniques for enhancing user equipment performance for multiple subscriber identification module operation in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include identifying a first set of bands associated with a first subscription. The operations of 905 may be performed in accordance with examples as disclosed herein. In some examples, aspects of the operations of 905 may be performed by a band identification component 725 as described with reference to FIG. 7.

At 910, the method may include identifying a second set of bands associated with a second subscription different from the first subscription. The operations of 910 may be performed in accordance with examples as disclosed herein. In some examples, aspects of the operations of 910 may be performed by a band identification component 725 as described with reference to FIG. 7.

At 915, the method may include determining that a first band from the first set of bands and a second band from the second set of bands share a set of radio frequency front-end resources. The operations of 915 may be performed in accordance with examples as disclosed herein. In some examples, aspects of the operations of 915 may be performed by a resource determination component 730 as described with reference to FIG. 7.

At 920, the method may include refraining from communicating on a third band from the first set of bands, the third band being associated with a secondary component carrier of a multi-carrier communications scheme, where refraining from communicating on the third band is based on determining that the first band and the second band share the set of radio frequency front-end resources and the third band being associated with the secondary component carrier. The operations of 920 may be performed in accordance with examples as disclosed herein. In some examples, aspects of the operations of 920 may be performed by a transmission component 735 as described with reference to FIG. 7.

At 925, the method may include communicating on a remaining set of bands from the first set of bands and the second set of bands based at least in part on refraining from communicating on the third band. The operations of 925 may be performed in accordance with examples as disclosed herein. In some examples, aspects of the operations of 925 may be performed by a transmission component 735 as described with reference to FIG. 7.

Figure 10:
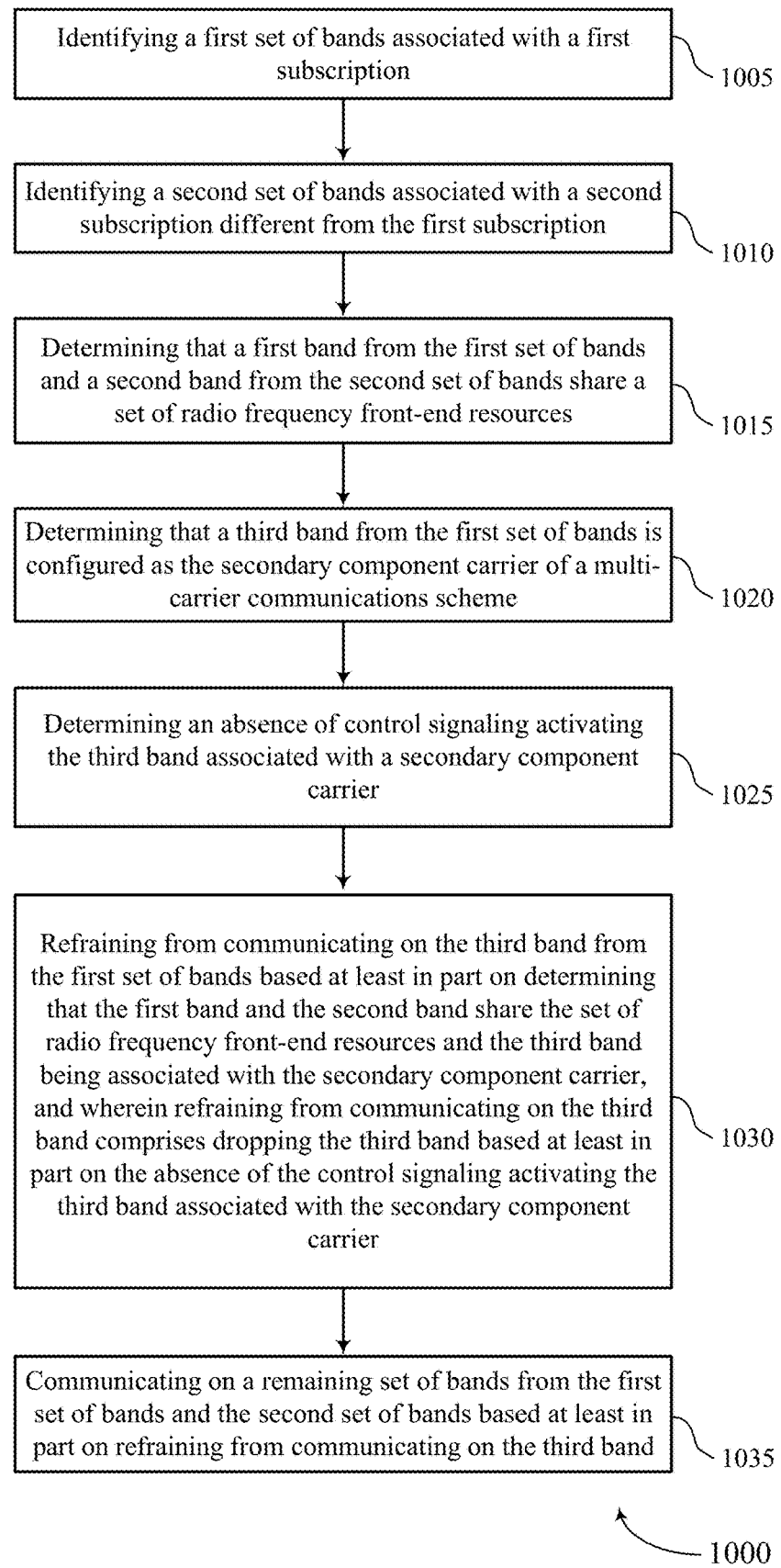

FIG. 10 shows a flowchart illustrating a method 1000 that supports techniques for enhancing user equipment performance for multiple subscriber identification module operation in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include identifying a first set of bands associated with a first subscription. The operations of 1005 may be performed in accordance with examples as disclosed herein. In some examples, aspects of the operations of 1005 may be performed by a band identification component 725 as described with reference to FIG. 7.

At 1010, the method may include identifying a second set of bands associated with a second subscription different from the first subscription. The operations of 1010 may be performed in accordance with examples as disclosed herein. In some examples, aspects of the operations of 1010 may be performed by a band identification component 725 as described with reference to FIG. 7.

At 1015, the method may include determining that a first band from the first set of bands and a second band from the second set of bands share a set of radio frequency front-end resources. The operations of 1015 may be performed in accordance with examples as disclosed herein. In some examples, aspects of the operations of 1015 may be performed by a resource determination component 730 as described with reference to FIG. 7.

At 1020, the method may include determining that a third band from the first set of bands is configured as a secondary component carrier of a multi-carrier communications scheme. The operations of 1020 may be performed in accordance with examples as disclosed herein. In some examples, aspects of the operations of 1020 may be performed by a component carrier manager 745 as described with reference to FIG. 7.

At 1025, the method may include determining an absence of control signaling activating the third band associated with the secondary component carrier. The operations of 1025 may be performed in accordance with examples as disclosed herein. In some examples, aspects of the operations of 1025 may be performed by a component carrier manager 745 as described with reference to FIG. 7.

At 1030, the method may include refraining from communicating on the third band from the first set of bands based on determining that the first band and the second band share the set of radio frequency front-end resources and the third band being associated with the secondary component carrier, where refraining from communicating on the third band includes dropping the third band based on the absence of the control signaling activating the third band associated with the secondary component carrier. The operations of 1030 may be performed in accordance with examples as disclosed herein. In some examples, aspects of the operations of 1030 may be performed by a transmission component 735 as described with reference to FIG. 7.

At 1035, the method may include communicating on a remaining set of bands from the first set of bands and the second set of bands based at least in part on refraining from communicating on the third band. The operations of 1035 may be performed in accordance with examples as disclosed herein. In some examples, aspects of the operations of 1035 may be performed by a transmission component 735 as described with reference to FIG. 7.

Figure 11:
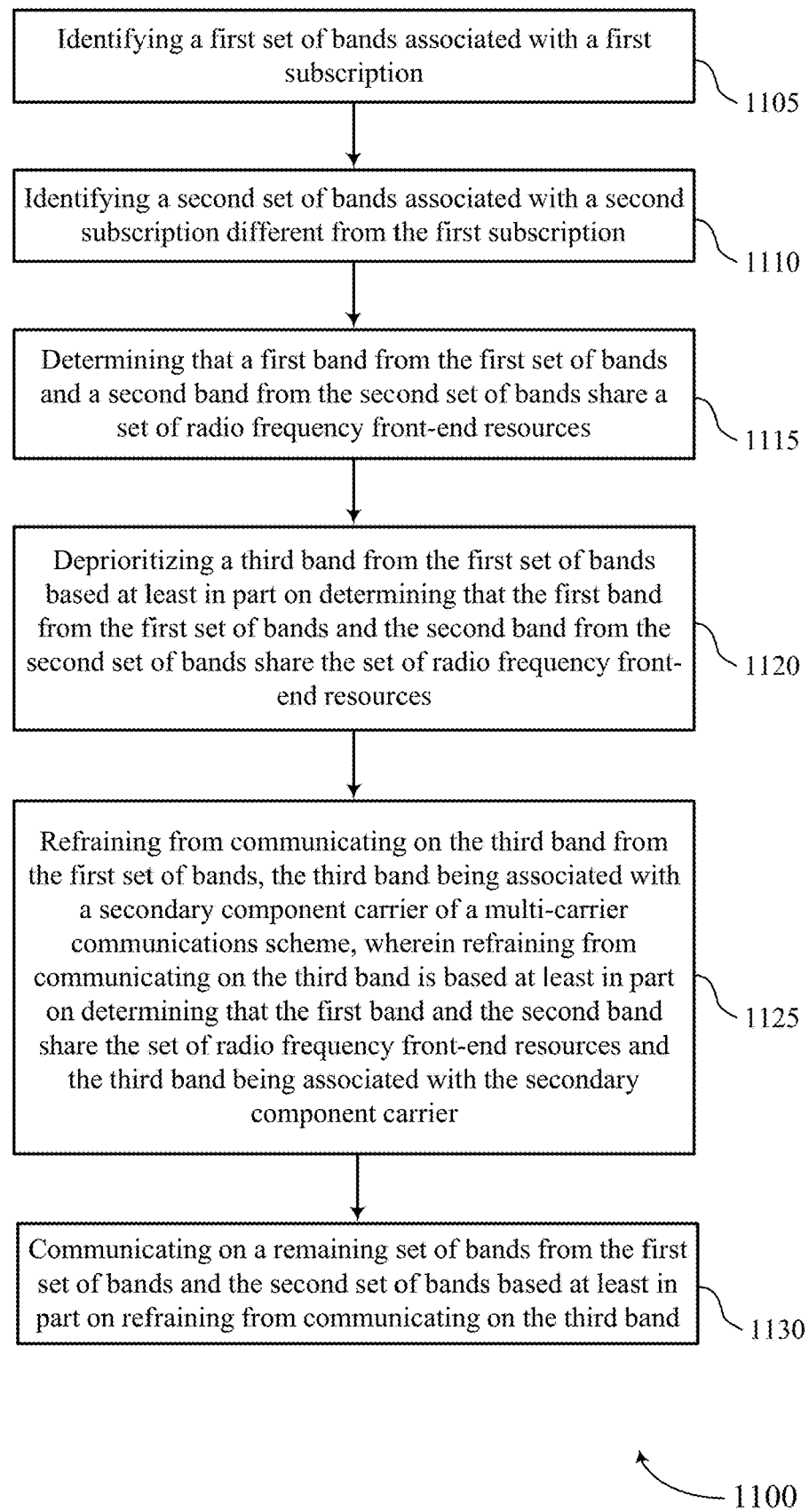

FIG. 11 shows a flowchart illustrating a method 1100 that supports techniques for enhancing user equipment performance for multiple subscriber identification module operation in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include identifying a first set of bands associated with a first subscription. The operations of 1105 may be performed in accordance with examples as disclosed herein. In some examples, aspects of the operations of 1105 may be performed by a band identification component 725 as described with reference to FIG. 7.

At 1110, the method may include identifying a second set of bands associated with a second subscription different from the first subscription. The operations of 1110 may be performed in accordance with examples as disclosed herein. In some examples, aspects of the operations of 1110 may be performed by a band identification component 725 as described with reference to FIG. 7.

At 1115, the method may include determining that a first band from the first set of bands and a second band from the second set of bands share a set of radio frequency front-end resources. The operations of 1115 may be performed in accordance with examples as disclosed herein. In some examples, aspects of the operations of 1115 may be performed by a resource determination component 730 as described with reference to FIG. 7.

At 1120, the method may include deprioritizing a third band from the first set of bands based on determining that the first band from the first set of bands and the second band from the second set of bands share the set of radio frequency front-end resources. The operations of 1120 may be performed in accordance with examples as disclosed herein. In some examples, aspects of the operations of 1120 may be performed by a prioritization component 755 as described with reference to FIG. 7.

At 1125, the method may include refraining from communicating on the third band from the first set of bands, the third band being associated with a secondary component carrier of a multi-carrier communications scheme, where refraining from communicating on the third band is based on determining that the first band and the second band share the set of radio frequency front-end resources and the third band being associated with the secondary component carrier. The operations of 1125 may be performed in accordance with examples as disclosed herein. In some examples, aspects of the operations of 1125 may be performed by a transmission component 735 as described with reference to FIG. 7.

At 1130, the method may include communicating on a remaining set of bands from the first set of bands and the second set of bands based at least in part on refraining from communicating on the third band. The operations of 1130 may be performed in accordance with examples as disclosed herein. In some examples, aspects of the operations of 1130 may be performed by a transmission component 735 as described with reference to FIG. 7.

Figure 12:
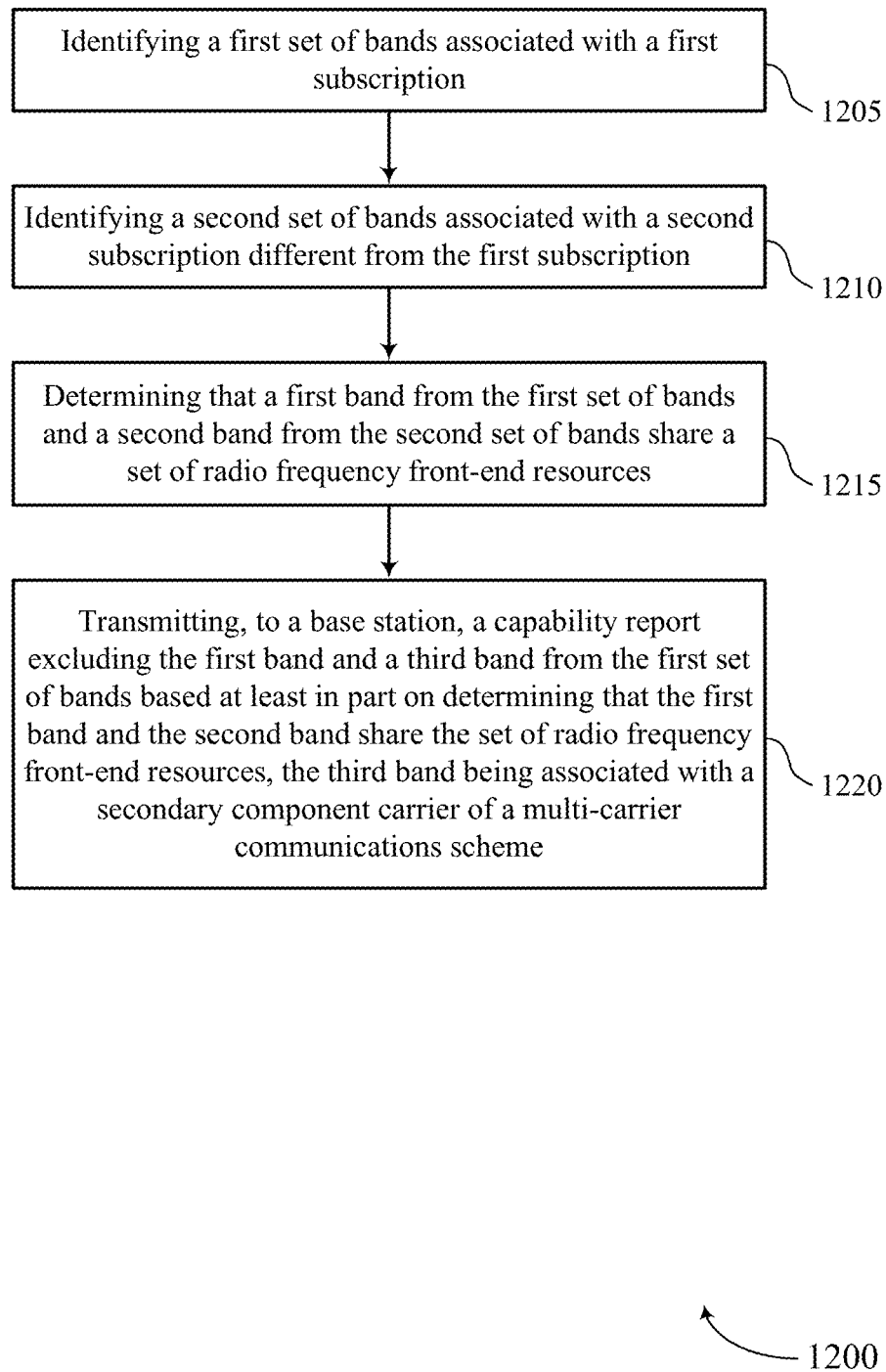

FIG. 12 shows a flowchart illustrating a method 1200 that supports techniques for enhancing user equipment performance for multiple subscriber identification module operation in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include identifying a first set of bands associated with a first subscription. The operations of 1205 may be performed in accordance with examples as disclosed herein. In some examples, aspects of the operations of 1205 may be performed by a band identification component 725 as described with reference to FIG. 7.

At 1210, the method may include identifying a second set of bands associated with a second subscription different from the first subscription. The operations of 1210 may be performed in accordance with examples as disclosed herein. In some examples, aspects of the operations of 1210 may be performed by a band identification component 725 as described with reference to FIG. 7.

At 1215, the method may include determining that a first band from the first set of bands and a second band from the second set of bands share a set of radio frequency front-end resources. The operations of 1215 may be performed in accordance with examples as disclosed herein. In some examples, aspects of the operations of 1215 may be performed by a resource determination component 730 as described with reference to FIG. 7.

At 1220, the method may include transmitting, to a base station, a capability report excluding the first band and a third band from the first set of bands based on determining that the first band and the second band share the set of radio frequency front-end resources, the third band being associated with a secondary component carrier of a multi-carrier communications scheme. The operations of 1220 may be performed in accordance with examples as disclosed herein. In some examples, aspects of the operations of 1220 may be performed by a capability report component 740 as described with reference to FIG. 7.

Figure 13:
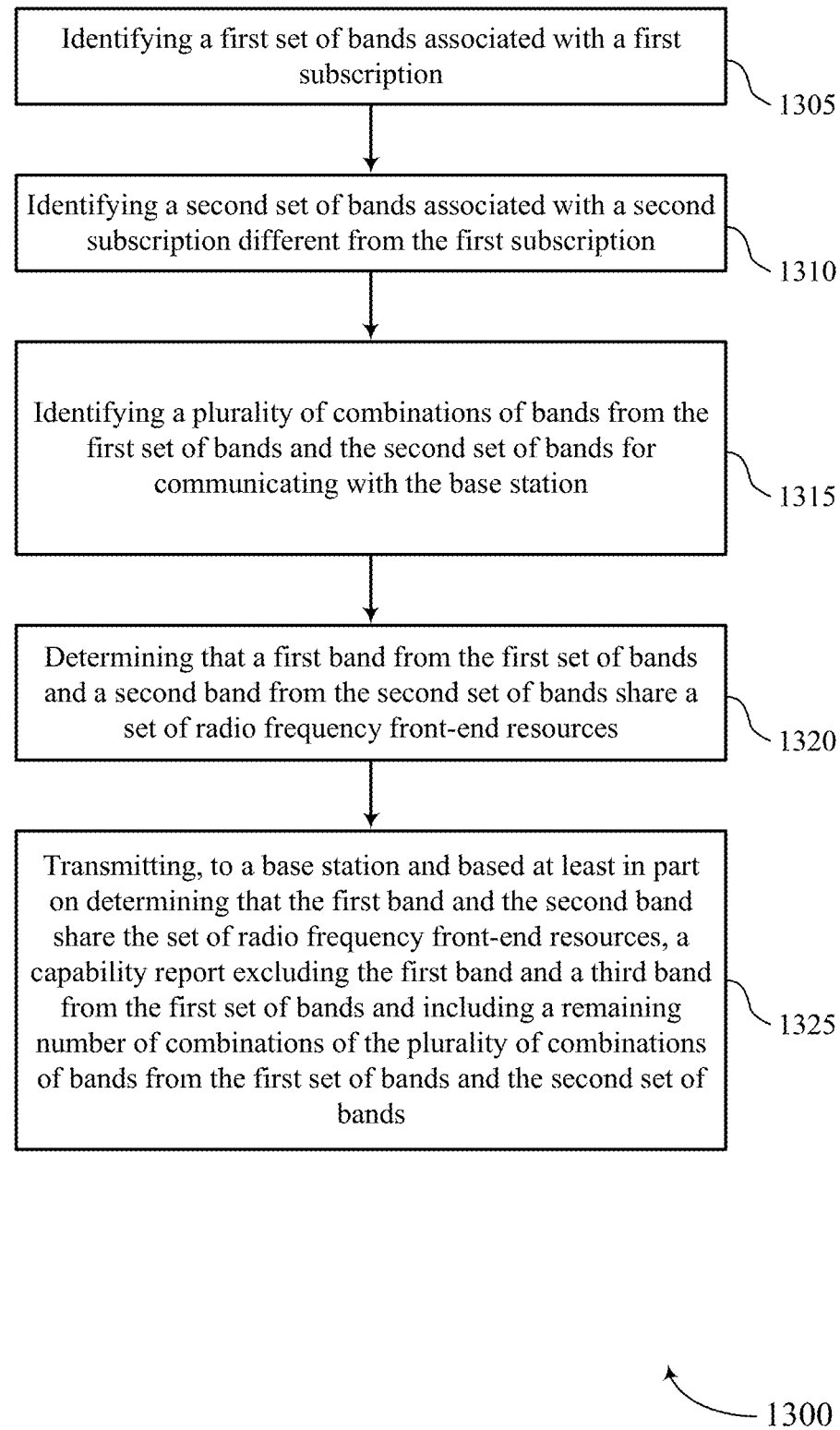

FIG. 13 shows a flowchart illustrating a method 1300 that supports techniques for enhancing user equipment performance for multiple subscriber identification module operation in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include identifying a first set of bands associated with a first subscription. The operations of 1305 may be performed in accordance with examples as disclosed herein. In some examples, aspects of the operations of 1305 may be performed by a band identification component 725 as described with reference to FIG. 7.

At 1310, the method may include identifying a second set of bands associated with a second subscription different from the first subscription. The operations of 1310 may be performed in accordance with examples as disclosed herein. In some examples, aspects of the operations of 1310 may be performed by a band identification component 725 as described with reference to FIG. 7.

At 1315, the method may include identifying a set of multiple combinations of bands from the first set of bands and the second set of bands for communicating with the base station, where a combination of the first band and the second band is included in the set of multiple combinations. The operations of 1315 may be performed in accordance with examples as disclosed herein. In some examples, aspects of the operations of 1315 may be performed by a band identification component 725 as described with reference to FIG. 7.

At 1320, the method may include determining that a first band from the first set of bands and a second band from the second set of bands share a set of radio frequency front-end resources. The operations of 1320 may be performed in accordance with examples as disclosed herein. In some examples, aspects of the operations of 1320 may be performed by a resource determination component 730 as described with reference to FIG. 7.

At 1325, the method may include transmitting, to a base station and based on determining that the first band and the second band share the set of radio frequency front-end resources, a capability report excluding the first band and a third band from the first set of bands and including a remaining number of combinations of the set of multiple combinations of bands from the first set of bands and the second set of bands. The operations of 1325 may be performed in accordance with examples as disclosed herein. In some examples, aspects of the operations of 1325 may be performed by a capability report component 740 as described with reference to FIG. 7.

The following provides an overview of aspects of the present disclosure:

Aspect 1: A method for wireless communication at a UE, comprising: identifying a first set of bands associated with a first subscription; identifying a second set of bands associated with a second subscription different from the first subscription; determining that a first band from the first set of bands and a second band from the second set of bands share a set of radio frequency front-end resources; refraining from communicating on a third band from the first set of bands, the third band being associated with a secondary component carrier of a multi-carrier communications scheme, wherein refraining from communicating on the third band is based at least in part on determining that the first band and the second band share the set of radio frequency front-end resources and the third band being associated with the secondary component carrier; and communicating on a remaining set of bands from the first set of bands and the second set of bands based at least in part on refraining from communicating on the third band.

Aspect 2: The method of aspect 1, further comprising: determining that the third band is configured as the secondary component carrier; and determining an absence of control signaling activating the third band associated with the secondary component carrier, wherein refraining from communicating on the third band comprises dropping the third band based at least in part on the absence of the control signaling activating the third band associated with the secondary component carrier.

Aspect 3: The method of any of aspects 1 through 2, further comprising: receiving, from a base station, control signaling activating the third band associated with the secondary component carrier; and determining that the third band associated with the secondary component carrier and is activated based at least in part on receiving the control signaling.

Aspect 4: The method of aspect 3, wherein refraining from communicating on the third band comprises: dropping the third band associated with the secondary component carrier based at least in part on determining that the first band from the first set of bands and the second band from the second set of bands shares the set of radio frequency front-end resources and the third band being activated.

Aspect 5: The method of aspect 4, wherein refraining from communicating on the third band comprises: reporting a compensated measurement on the third band associated with the secondary component carrier based at least in part on determining that the first band from the first set of bands and the second band from the second set of bands share the set of radio frequency front-end resources and the third band being activated, wherein the third band is dropped based at least in part on the reported compensated measurement.

Aspect 6: The method of any of aspects 4 through 5, further comprising: identifying a number of resource grants associated with the secondary component carrier based at least in part on the third band being activated, wherein the third band is dropped based at least in part on the identified number of resource grants associated with the secondary component carrier.

Aspect 7: The method of any of aspects 1 through 6, further comprising: deprioritizing the third band from the first set of bands based at least in part on determining that the first band from the first set of bands and the second band from the second set of bands shares the set of radio frequency front-end resources.

Aspect 8: The method of aspect 7, wherein deprioritizing the third band comprises: reporting a compensated measurement on the third band from the first set of bands based at least in part on determining that the first band from the first set of bands and the second band from the second set of bands share the set of radio frequency front-end resources.

Aspect 9: The method of any of aspects 7 through 8, wherein deprioritizing the third band comprises: refraining from reporting a measurement on the third band from the first set of bands based at least in part on determining that the first band from the first set of bands and the second band from the second set of bands share the set of radio frequency front-end resources.

Aspect 10: The method of any of aspects 1 through 9, wherein communicating on the remaining set of bands from the first set of bands comprises: simultaneously communicating on the remaining set of bands for the first subscription and the second set of bands for the second subscription based at least in part on refraining from communicating on the third band associated with the secondary component carrier.

Aspect 11: The method of any of aspects 1 through 10, wherein determining that the first band from the first set of bands and the second band from the second set of bands share the set of radio frequency front-end resources comprises: determining that a combination of at least the first band, the second band, and the third band is associated with a full tune-away operation from the first subscription.

Aspect 12: The method of any of aspects 1 through 11, wherein the UE is configured to operate in a non-standalone mode of operation using the first set of bands.

Aspect 13: The method of any of aspects 1 through 12, wherein the first subscription is associated with a multi-carrier operation and the second subscription is associated with a single-carrier operation.

Aspect 14: The method of any of aspects 1 through 13, wherein a communication state for the first set of bands comprises a dual-connectivity mode and a communication state for the second set of bands comprises an idle mode.

Aspect 15: A method for wireless communication at a UE, comprising: identifying a first set of bands associated with a first subscription; identifying a second set of bands associated with a second subscription different from the first subscription; determining that a first band from the first set of bands and a second band from the second set of bands share a set of radio frequency front-end resources; and transmitting, to a base station, a capability report excluding the first band and a third band from the first set of bands based at least in part on determining that the first band and the second band shares the set of radio frequency front-end resources, the third band being associated with a secondary component carrier of a multi-carrier communications scheme.

Aspect 16: The method of aspect 15, further comprising: identifying a plurality of combinations of bands from the first set of bands and the second set of bands for communicating with the base station, wherein a combination of the first band and the second band is included in the plurality of combinations.

Aspect 17: The method of aspect 16, wherein transmitting the capability report comprises: transmitting the capability report including a remaining number of combinations of the plurality of combinations of bands from the first set of bands and the second set of bands.

Aspect 18: The method of any of aspects 15 through 17, further comprising: refraining from communicating on the third band based at least in part on transmitting the capability report excluding the first band and the third band.

Aspect 19: The method of any of aspects 15 through 18, wherein the UE is configured to operate in a non-standalone mode of operation.

Aspect 20: The method of any of aspects 15 through 19, wherein the first subscription is associated with a multi-carrier operation and the second subscription is associated with a single-carrier operation.

Aspect 21: The method of any of aspects 15 through 20, wherein a communication state for the first set of bands comprises a dual-connectivity mode a communication state for the second set of bands comprises an idle mode.

Aspect 22: An apparatus for wireless communication at a UE, comprising a processor; memory coupled with the processor; and instructions stored in the memory and executable by the processor to cause the apparatus to perform a method of any of aspects 1 through 14.

Aspect 23: An apparatus for wireless communication at a UE, comprising at least one means for performing a method of any of aspects 1 through 14.

Aspect 24: A non-transitory computer-readable medium storing code for wireless communication at a UE, the code comprising instructions executable by a processor to perform a method of any of aspects 1 through 14.

Aspect 25: An apparatus for wireless communication at a UE, comprising a processor; memory coupled with the processor; and instructions stored in the memory and executable by the processor to cause the apparatus to perform a method of any of aspects 15 through 21.

Aspect 26: An apparatus for wireless communication at a UE, comprising at least one means for performing a method of any of aspects 15 through 21.

Aspect 27: A non-transitory computer-readable medium storing code for wireless communication at a UE, the code comprising instructions executable by a processor to perform a method of any of aspects 15 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    identifying a first set of bands associated with a first subscription;
    identifying a second set of bands associated with a second subscription different from the first subscription;
    determining that a first band from the first set of bands and a second band from the second set of bands share a set of radio frequency front-end resources;
    refraining from communicating on a third band from the first set of bands, the third band being associated with a secondary component carrier of a multi-carrier communications scheme, wherein refraining from communicating on the third band is based at least in part on determining that the first band and the second band share the set of radio frequency front-end resources and the third band being associated with the secondary component carrier; and
    communicating on a remaining set of bands from the first set of bands and the second set of bands based at least in part on refraining from communicating on the third band.

2. The method of claim 1, further comprising:
    determining that the third band is configured as the secondary component carrier; and
    determining an absence of control signaling activating the third band associated with the secondary component carrier, wherein refraining from communicating on the third band comprises dropping the third band based at least in part on the absence of the control signaling activating the third band associated with the secondary component carrier.

3. The method of claim 1, further comprising:
    receiving, from a base station, control signaling activating the third band associated with the secondary component carrier; and
    determining that the third band associated with the secondary component carrier and is activated based at least in part on receiving the control signaling.

4. The method of claim 3, wherein refraining from communicating on the third band comprises:
    dropping the third band associated with the secondary component carrier based at least in part on determining that the first band from the first set of bands and the second band from the second set of bands share the set of radio frequency front-end resources and the third band being activated.

5. The method of claim 4, wherein refraining from communicating on the third band comprises:
    reporting a compensated measurement on the third band associated with the secondary component carrier based at least in part on determining that the first band from the first set of bands and the second band from the second set of bands share the set of radio frequency front-end resources and the third band being activated, wherein the third band is dropped based at least in part on the reported compensated measurement.

6. The method of claim 4, further comprising:
    identifying a number of resource grants associated with the secondary component carrier based at least in part on the third band being activated, wherein the third band is dropped based at least in part on the identified number of resource grants associated with the secondary component carrier.

7. The method of claim 1, further comprising:
deprioritizing the third band from the first set of bands based at least in part on determining that the first band from the first set of bands and the second band from the second set of bands share the set of radio frequency front-end resources.

8. The method of claim 7, wherein deprioritizing the third band comprises:
reporting a compensated measurement on the third band from the first set of bands based at least in part on determining that the first band from the first set of bands and the second band from the second set of bands share the set of radio frequency front-end resources.

9. The method of claim 7, wherein deprioritizing the third band comprises:
refraining from reporting a measurement on the third band from the first set of bands based at least in part on determining that the first band from the first set of bands and the second band from the second set of bands share the set of radio frequency front-end resources.

10. The method of claim 1, wherein communicating on the remaining set of bands from the first set of bands comprises:
simultaneously communicating on the remaining set of bands for the first subscription and the second set of bands for the second subscription based at least in part on refraining from communicating on the third band associated with the secondary component carrier.

11. The method of claim 1, wherein determining that the first band from the first set of bands and the second band from the second set of bands share the set of radio frequency front-end resources comprises:
determining that a combination of at least the first band, the second band, and the third band is associated with a full tune-away operation from the first subscription.

12. A method for wireless communication at a user equipment (UE), comprising:
identifying a first set of bands associated with a first subscription;
identifying a second set of bands associated with a second subscription different from the first subscription;
determining that a first band from the first set of bands and a second band from the second set of bands share a set of radio frequency front-end resources; and
transmitting, to a base station, a capability report excluding the first band and a third band from the first set of bands based at least in part on determining that the first band and the second band share the set of radio frequency front-end resources, the third band being associated with a secondary component carrier of a multi-carrier communications scheme.

13. The method of claim 12, further comprising:
identifying a plurality of combinations of bands from the first set of bands and the second set of bands for communicating with the base station, wherein a combination of the first band and the second band is included in the plurality of combinations.

14. The method of claim 13, wherein transmitting the capability report comprises:
transmitting the capability report including a remaining number of combinations of the plurality of combinations of bands from the first set of bands and the second set of bands.

15. The method of claim 12, further comprising:
refraining from communicating on the third band based at least in part on transmitting the capability report excluding the first band and the third band.

16. An apparatus for wireless communication at a user equipment (UE), comprising:
a processor;
memory coupled with the processor; and
instructions stored in the memory and executable by the processor to cause the apparatus to:
identify a first set of bands associated with a first subscription;
identify a second set of bands associated with a second subscription different from the first subscription;
determine that a first band from the first set of bands and a second band from the second set of bands share a set of radio frequency front-end resources;
refrain from communicating on a third band from the first set of bands, the third band being associated with a secondary component carrier of a multi-carrier communications scheme, wherein refraining from communicating on the third band is based at least in part on determining that the first band and the second band share the set of radio frequency front-end resources and the third band being associated with the secondary component carrier; and
communicate on a remaining set of bands from the first set of bands and the second set of bands based at least in part on refraining from communicating on the third band.

17. The apparatus of claim 16, wherein the instructions are further executable by the processor to cause the apparatus to:
determine that the third band is configured as the secondary component carrier; and
determine an absence of control signaling activating the third band associated with the secondary component carrier, wherein refraining from communicating on the third band comprises dropping the third band based at least in part on the absence of the control signaling activating the third band associated with the secondary component carrier.

18. The apparatus of claim 16, wherein the instructions are further executable by the processor to cause the apparatus to:
receive, from a base station, control signaling activating the third band associated with the secondary component carrier; and
determine that the third band associated with the secondary component carrier and is activated based at least in part on receiving the control signaling.

19. The apparatus of claim 18, wherein the instructions to refrain from communicating on the third band are executable by the processor to cause the apparatus to:
drop the third band associated with the secondary component carrier based at least in part on determining that the first band from the first set of bands and the second band from the second set of bands share the set of radio frequency front-end resources and the third band being activated.

20. The apparatus of claim 19, wherein the instructions to refrain from communicating on the third band are executable by the processor to cause the apparatus to:
report a compensated measurement on the third band associated with the secondary component carrier based at least in part on determining that the first band from the first set of bands and the second band from the second set of bands share the set of radio frequency front-end resources and the third band being activated, wherein the third band is dropped based at least in part on the reported compensated measurement.

21. The apparatus of claim 19, wherein the instructions are further executable by the processor to cause the apparatus to:
identify a number of resource grants associated with the secondary component carrier based at least in part on the third band being activated, wherein the third band is dropped based at least in part on the identified number of resource grants associated with the secondary component carrier.

22. The apparatus of claim 16, wherein the instructions are further executable by the processor to cause the apparatus to:
deprioritize the third band from the first set of bands based at least in part on determining that the first band from the first set of bands and the second band from the second set of bands share the set of radio frequency front-end resources.

23. The apparatus of claim 22, wherein the instructions to deprioritize the third band are executable by the processor to cause the apparatus to:
report a compensated measurement on the third band from the first set of bands based at least in part on determining that the first band from the first set of bands and the second band from the second set of bands share the set of radio frequency front-end resources.

24. The apparatus of claim 22, wherein the instructions to deprioritize the third band are executable by the processor to cause the apparatus to:
refrain from reporting a measurement on the third band from the first set of bands based at least in part on determining that the first band from the first set of bands and the second band from the second set of bands share the set of radio frequency front-end resources.

25. The apparatus of claim 16, wherein the instructions for communicating on the remaining set of bands from the first set of bands are further executable by the processor to cause the apparatus to:
simultaneously communicate on the remaining set of bands for the first subscription and the second set of bands for the second subscription based at least in part on refraining from communicating on the third band associated with the secondary component carrier.

26. The apparatus of claim 16, wherein the instructions to determine that the first band from the first set of bands and the second band from the second set of bands share the set of radio frequency front-end resources are executable by the processor to cause the apparatus to:
determine that a combination of at least the first band, the second band, and the third band is associated with a full tune-away operation from the first subscription.

27. An apparatus for wireless communication at a user equipment (UE), comprising:
a processor;
memory coupled with the processor; and
instructions stored in the memory and executable by the processor to cause the apparatus to:
identify a first set of bands associated with a first subscription;
identify a second set of bands associated with a second subscription different from the first subscription;
determine that a first band from the first set of bands and a second band from the second set of bands share a set of radio frequency front-end resources; and
transmit, to a base station, a capability report excluding the first band and a third band from the first set of bands based at least in part on determining that the first band and the second band share the set of radio frequency front-end resources, the third band being associated with a secondary component carrier of a multi-carrier communications scheme.

28. The apparatus of claim 27, wherein the instructions are further executable by the processor to cause the apparatus to:
identify a plurality of combinations of bands from the first set of bands and the second set of bands for communicating with the base station, wherein a combination of the first band and the second band is included in the plurality of combinations.

29. The apparatus of claim 28, wherein the instructions to transmit the capability report are executable by the processor to cause the apparatus to:
transmit the capability report including a remaining number of combinations of the plurality of combinations of bands from the first set of bands and the second set of bands.

30. The apparatus of claim 27, wherein the instructions are further executable by the processor to cause the apparatus to:
refrain from communicating on the third band based at least in part on transmitting the capability report excluding the first band and the third band.

* * * * *